(12) United States Patent
Knox

(10) Patent No.: US 8,077,639 B2
(45) Date of Patent: Dec. 13, 2011

(54) HIGH ISOLATION SIGNAL ROUTING ASSEMBLY FOR FULL DUPLEX COMMUNICATION

(76) Inventor: Michael E. Knox, Manhasset, NY (US)

( * ) Notice: Subject to any disclaimer, the term of this patent is extended or adjusted under 35 U.S.C. 154(b) by 16 days.

(21) Appl. No.: 12/459,242

(22) Filed: Jun. 29, 2009

(65) Prior Publication Data
US 2009/0268642 A1    Oct. 29, 2009

Related U.S. Application Data

(63) Continuation-in-part of application No. PCT/US2007/026459, filed on Dec. 29, 2007.

(60) Provisional application No. 60/877,995, filed on Dec. 29, 2006.

(51) Int. Cl.
*H04B 7/005* (2006.01)
(52) U.S. Cl. .............. 370/278; 385/16; 385/17
(58) Field of Classification Search .......... 370/277, 370/278; 385/16, 17
See application file for complete search history.

(56) References Cited

U.S. PATENT DOCUMENTS

| | | | |
|---|---|---|---|
| 3,009,794 A | 3/1960 | Essam et al. |
| 4,134,068 A | 1/1979 | Richardson |
| 4,641,365 A | 2/1987 | Montini, Jr. |
| 4,725,842 A | 2/1988 | Mayberry |
| 4,742,354 A | 5/1988 | Wen et al. |
| 4,924,236 A | 5/1990 | Schuss et al. |
| 4,968,967 A | 11/1990 | Stove |
| 5,027,084 A | 6/1991 | Tsukii |
| 5,125,108 A | 6/1992 | Talwar |
| 5,129,099 A | 7/1992 | Roberts |
| 5,153,596 A | 10/1992 | Stove |
| 5,164,985 A | 11/1992 | Nysen et al. |
| 5,173,703 A | 12/1992 | Mangiapane et al. |
| 5,349,365 A | 9/1994 | Ow et al. |
| 5,359,331 A | 10/1994 | Adler |
| 5,561,397 A * | 10/1996 | Kumar et al. .......... 330/295 |

(Continued)

FOREIGN PATENT DOCUMENTS

GB    2372902    4/2002
(Continued)

OTHER PUBLICATIONS

G. Lathiere et al., A Novel Balance Circulator for FDD MC-CDMA Communications, Oct. 12, 2004, 34$^{th}$ European Microwave Conference—Amsterdam, 2004, pp. 605-608.

(Continued)

*Primary Examiner* — Albert T Chou
(74) *Attorney, Agent, or Firm* — Herbert E. Ruschmann

(57) ABSTRACT

A signal routing assembly accepts a first transmission signal at an input and outputs a substantial portion of the signal at a common port of the signal routing assembly. A second transmission signal is received at the common port and is routed through the signal routing assembly delivered to output of the signal routing assembly. Leakage signals from routing devices leaking the first transmission signal are terminated inside the signal routing assembly. Leakage signal from a divider/combiner are cancelled by reflect signal from at least one reflector device. A transmitter produces the first transmission signal and the signal routing assembly delivers this signal to the common port of the signal routing assembly. In full duplex operation, second transmission signals received at the common port are routed to the output to be applied to a receiver.

45 Claims, 16 Drawing Sheets

U.S. PATENT DOCUMENTS

| | | | |
|---|---|---|---|
| 5,596,325 | A | 1/1997 | Maas |
| 5,701,595 | A | 12/1997 | Green, Jr. |
| 5,771,320 | A * | 6/1998 | Stone ............................... 385/16 |
| 5,815,803 | A | 9/1998 | Ho et al. |
| 5,861,837 | A | 1/1999 | Richardson et al. |
| 5,896,113 | A | 4/1999 | O'Neill, Jr. |
| 5,909,196 | A | 6/1999 | O'Neill, Jr. |
| 5,920,292 | A | 7/1999 | O'Neill, Jr. |
| 5,969,681 | A | 10/1999 | O'Neill, Jr. |
| 6,181,286 | B1 | 1/2001 | Roscoe et al. |
| 6,184,834 | B1 | 2/2001 | Utsumi et al. |
| 6,313,713 | B1 | 11/2001 | Ho et al. |
| 6,509,883 | B1 | 1/2003 | Foti et al. |
| 6,720,912 | B2 | 4/2004 | Shono |
| 6,720,935 | B2 | 4/2004 | Lamensdorf et al. |
| 6,870,986 | B1 * | 3/2005 | Stone ............................... 385/17 |
| 6,952,183 | B2 | 10/2005 | Yuanzhu |
| 7,834,719 | B2 | 11/2010 | Cheung et al. |
| 7,855,617 | B2 | 12/2010 | Cheung et al. |
| 2002/0031224 | A1 | 3/2002 | Basawapatna et al. |
| 2002/0032039 | A1 | 3/2002 | Kimata |
| 2002/0177417 | A1 | 11/2002 | Visser |
| 2003/0090405 | A1 | 5/2003 | Rausch et al. |
| 2004/0077353 | A1 | 4/2004 | Mahany |
| 2004/0124944 | A1 | 7/2004 | Nation |
| 2005/0078683 | A1 | 4/2005 | Page |
| 2005/0153664 | A1 | 7/2005 | Moloudi et al. |
| 2009/0028074 | A1 * | 1/2009 | Knox ............................ 370/278 |
| 2009/0274072 | A1 * | 11/2009 | Knox ............................ 370/278 |
| 2010/0216413 | A1 | 8/2010 | Khannur |

FOREIGN PATENT DOCUMENTS

| | | |
|---|---|---|
| WO | WO/2007/002273 | 1/2007 |
| WO | WO/2008/105742 | 9/2008 |

OTHER PUBLICATIONS

Craig A. Grimes et al., "An Experimental Investigation Into the Control of Antenna Input Impedance Through Cancellation of near Field Standing Energy", May 1998, 0-7803-4311-5/98, pp. 273-282, IEEE MTT 1988.

Leo G. Maloratsky, "An Aircraft Single-Antenna FM Radio Altimeter," May 2003, p. 196 (14pgs) Microwave Journal.

Matjaz Vidmar, "Design Improves 4.3 Ghz Radio Altimeter Accuracy", Jun. 2004, pp. 1-5, and Figs.1-6, Microwaves & RF http:/www.mwrf/Articles/Print.cfm?ArticleID=10583.

Written Opinion and Search Report of the International Searching Authority (ISA/US) in PCT/US2007/026459, completed Apr. 24, 2008 and mailed May 16, 2008.

Written Opinion and Search Report of the International Searching Authority (ISA/US) in PCT/US2006/024280, mailed Feb. 16, 2007.

* cited by examiner

HIGH ISOLATION SIGNAL ROUTING ASSEMBLY FOR FULL DUPLEX COMMUNICATION

RELATED APPLICATIONS

This application is a continuation-in-part of international application PCT/US2007/026459, filed Dec. 29, 2007 which claims priority to U.S. provisional application 60/877,995, filed Dec. 29, 2006, and each of said applications is herein incorporated by reference.

TECHNICAL FIELD

The present invention relates to wireless transceivers that operate in full duplex mode providing the simultaneous transmission and reception of radio signals. In particular, but not exclusively, the present invention relates to wireless transceivers that are provided with a means to isolate signals transmitted by the transmitter of the wireless transceiver and received by a receiver of the wireless transceiver.

BACKGROUND OF THE INVENTION

Modern wireless communication, radar and radio frequency identification (RFID) systems often operate under full duplex operation. A wireless transceiver comprises of a local transmitter and a local receiver. Full duplex operation occurs when a local transmitter is actively transmitting RF signals during the same time that a local receiver is detecting RF signals and/or backscatter from the surrounding environment. The local transmitter and local receiver are typically in close proximity to one another and are often placed within a common enclosure. It is also desired to operate the full duplex system using a monostatic configuration, namely a configuration that uses a single antenna common to both the local transmitter and local receiver. In a typical transceiver, the transmitted and received signals are typically routed to and routed from the single antenna using a duplexing filter, circulator or directional coupler.

It is known that the operation of a local receiver during the time that a local transmitter is transmitting creates receiver problems as the transmitter energy leaks, couples and/or reflects into the receiver resulting in corruption, distortion, saturation and/or desensitization within the receiver. In some cases, a duplexing filter may be used to isolate the transmitted energy from the receiver if the transmitter and receiver are configured to operate at two different RF carrier frequencies that allow the duplexing filter to provide the required isolation between the transmitter and receiver. If the system is designed to operate with the transmitter and receiver using the same RF carrier frequency or with different transmit and receive frequencies that are close in RF carrier frequency such that the duplexing filter can not adequately provide the required isolation, then a circulator or directional coupler is typically used to isolate the transmitted signal from entering the receiver. Depending on the isolation performance of the circulator or coupler, the system performance may degrade when a portion of the transmitted energy leaks into the receiver.

Circulators and directional couplers are three and four port devices that are used to route RF and microwave signals between various ports within the component. A RF or microwave signal entering the circulator or coupler is expected to exit at a desired port(s) where one port is isolated from the incident signal. In practice, a portion of the incident signal leaks or couples to the isolated port. The ratio of the undesired leakage to the incident signal is often referred to as the isolation of the device. When referring to directional couplers, the isolation term is sometimes referred as the coupler directivity which is defined as the (dB) difference between the isolation and the coupling value of the directional coupler.

A basic circulator, 1, is a three-port device that provides primary signal transmission between pairs of ports. A symbolic diagram of a circulator 1 is shown in FIG. 1. Signals are routed between pairs of ports in the direction of circulation arrow 5. For this example, the circulation arrow 5 in FIG. 1 shows a clockwise direction for signal paths. This circulation arrow 5 is used in the technical literature as a symbolic reference to the direction of signal paths within the circulator. Circulators can be manufactured to have either clockwise or counter-clockwise signal directions. A signal 6 entering the input port 2 will exit through the desired output port 3 following the clockwise circulation arrow 5. Ideally, the signal 7 leaving the circulator 1 will have the same magnitude level as the input signal 6. In practice, the signal 7 leaving the circulator 1 will have some reduction in amplitude due to losses and mismatches that occur inside the circulator. The signal 7 leaving the circulator 1 will also have a phase shift relative to the input signal 6. Ideally, no portion of the input signal 6 should leave the third port 4. This third port 4 is the isolated port. In practice, the isolated port 4 will have a signal level 8 reduced by approximately 20 dB when measured relative to the input signal 6. In practice, junction circulators typically have a minimum isolation of 20-25 dB and lumped element circulators typically have a minimum isolation of 13 dB.

The circulator 1 can also be configured to operate with the input signal entering port 3 and exiting through port 4. In this case port 2 is the isolated port. The circulator 1 can also be configured to operate with the input signal entering port 4 and exiting through port 2. In this case port 3 is the isolated port.

A typically transceiver application using a monostatic antenna configuration is shown in FIG. 2. In the case a local transmitter 9 generates a transmitted signal 6 that enters the input port 2 of the circulator 1. The circulator 1 routes the signal to the common port 3. The signal 7 leaves the circulator at the common port 3 and enters the antenna 12. Any received signal 10 captured by the antenna 12 from the surrounding environment enters the common port 3 of the circulator 1 and is routed to the output port 4. The desired received signal 13 leaving the output port 4 enters the local receiver 11. If the system uses a local transmitter 9 and local receiver 11 that are operating simultaneously, then a portion of the signal 6 from the active transmitter 9 may couple or leak through the circulator 1 and enter the active receiver 11. This undesired coupled signal 8 may reduce the performance of the receiver 11.

For certain applications where additional losses in the receive path will not effect the required system performance, it is possible to replace the circulator with a directional coupler. In this configuration, the directional coupler is used to route the signals between the transmitter 9 to the antenna 12, and from the antenna 12 to the receiver 11. FIG. 3 shows a monostatic antenna configuration using a directional coupler 21. In this configuration, the directional coupler 21 is positioned in order to transfer the signal 6 emitted from the local transmitter 9 to the antenna 12. The directional coupler is typically a four-port device where one of the ports are terminated using a resistive termination 25. The termination 25 is often matched to the characteristic impedance of the system, which is typically 50 ohms. In some cases, the termination 25 is included internally to the directional coupler which effectively makes the device into a three port component. A three port description for the directional coupler will be used throughout this disclosure. In the configuration shown in FIG.

3, the termination 25 is used to absorb energy coupled from the incident signal 6. Ideally no portion of the incident signal 6 should leave port 24 which connects the directional coupler 21 to the receiver 11. For signal reception from the surrounding environment, any received signals 10 captured by the antenna 12, will enter the directional coupler 21 at common port 23. A portion of the received signal 10 will be coupled to the output port 24. The desired coupled signal 13 will then enter the receiver 11. As the desired signal 13 is coupled to the output port 24 the amplitude level of the desired signal 13, will be reduced by the coupling factor. In some full duplex systems, such as passive UHF RFID systems, this additional loss in received energy does not create difficulties when recovering the received information as these systems are generally forward link limited. Problems may occur when a portion of the incident transmitter signal couples or leaks into the receiver through the directional coupler which in turn may reduce receiver performance. In this case, a portion of the transmitted signal, 6, may couple or leak through the directional coupler 21 and exit the output port 24. This undesired coupled signal 8 will enter the receiver 11 and may reduce the performance of the receiver 11.

In both configurations, shown in FIG. 2 and FIG. 3, it is important that the receiver not be desensitized by any signal (s) coming from the system. Signals that could desensitize the receiver include signals received by the antenna and signals that leak or couple over from the transmit channel. If the signal received by the antenna from the surrounding environment is the signal of interest, then it is assumed that the system has been designed as not to desensitize the receiver when this signal is present. Therefore undesired receiver desensitization may occur when signals leak from the local transmitter into the local receiver. It is well known in industry, that fabricating a circulator with very high isolation (>30 dB) is often difficult and expensive. A typical junction circulator may have 20 dB isolation resulting in 1% of the transmit energy leaking into the receiver channel. This leakage signal may greatly affect the performance of the receiver in a full duplex system. As an example, a typical RFID system that uses a transmitter with an output power of 1 watt (+30 dBm) and a circulator with an isolation of 20 dB would have an unwanted signal entering the receiver of 10 mwatt (+10 dBm). This level of undesired signal would typically saturate and/or desensitize a low power mixer placed in the front end of the receiver.

DISCLOSURE OF INVENTION

It is an object of the present invention to provide a two way duplex wireless communication signal routing assembly wherein the channel to channel isolation is improved over prior art arrangements. In particular, the present invention relates to a signal routing assembly, a full duplex transceiver routing assembly and a full duplex transceiver routing assembly including carrier modulation. The signal routing assembly provides high isolation between two separate transmission signal paths utilizing a common port and typically configured to provide high isolation in the direction from the transmit channel transmission path to the receive channel transmission path in a full duplex system. The signal routing assembly allows the two transmission paths to operate using the same carrier frequencies. The signal routing assembly also allows the two transmission paths to operate using different transmit and receive frequencies. In an advantageous application the two different frequencies are close in frequency and are therefore inadequately filtered using a duplexing filter.

Briefly stated, the present invention provides a wireless communication device for effecting two way full duplex wireless communications, where the signal routing assembly accepts the first transmission signal at the input and outputs, a substantial portion of this signal at the common port of the signal routing assembly and a second transmission signal received at the common port from the surrounding environment or other parts of the system is routed through the signal routing assembly and a portion of the second transmission signal is delivered to output of the signal routing assembly. Relative to the output of the signal routing assembly, leakage signals from the first transmission signal are terminated inside the signal routing assembly in a typical system, a transmitter produces the first transmission signal and the signal routing assembly delivers a substantial portion of this signal to the common port of the signal routing assembly that is typically connected to the antenna. In full duplex operation, second transmission signals received at the antenna from the surrounding environment are routed to the receiver through the signal routing assembly from the common port to the output where at least a portion of a second transmission signal is delivered to the receiver. The signal routing assembly cancels a substantial portion of the transmitter leakage signal from entering the receiver.

In an embodiment of the present invention, the signal routing assembly includes a signal divider receiving the first transmission signal and dividing the first transmission signal into first and second divided transmission signals having substantially equal amplitudes and a first relative phase shift therebetween. First and second routing devices are provided each having at least first, second and third ports, and being configured to simultaneously deliver a signal at the first port to the second port and another signal at the second port to the third port each at functionally operative levels. The first and second routing devices receive the first and second divided transmission signals at the first ports and routes them to the second ports producing a first and second divided transmission output signal respectively. The first and second routing devices simultaneously output a first and second transmission leakage signal at the third ports respectively. The first and second routing devices receive, when present, third and fourth divided transmission signals at the second ports and routes them to the third ports producing third and fourth divided transmission output signals respectively. Further provided is a signal divider/combiner having first and second divider/combiner ports configured to combine the first and second divided transmission signals with a second relative phase shift therebetween to output a substantial portion of the first transmission signal to the common port of the signal routing device. The signal divider/combiner receives, when present, a second transmission signal and dividing the second transmission signal into third and fourth divided transmission signals having substantially equal amplitudes and a second relative phase shift therebetween. Further provided is a signal combiner having first and second combiner inputs receiving first and second transmission leakage signals and, when present, third and fourth divided transmission output signals. The signal combiner is configured to introduce a third relative phase shift into at least one of the signals applied to the combiner inputs such that; the first and second transmission leakage signals have approximately 180 degrees relative phase shift and arrive at approximately the same amplitude levels at the output to substantially cancel each other, and the third and fourth divided transmission output signals have approximately 0 degrees relative phase shift and arrive at approximately the same amplitude levels at the output to substantially combine with each other.

In an embodiment of the present invention the signal divider is optionally a quadrature hybrid. Alternatively, the signal divider may be embodied as an equal phase power dividing device with a phase shift introduced into one branch.

It is a feature of the present invention the signal combiner is optionally a quadrature hybrid. Alternatively, the signal combiner may be embodied as an equal phase power dividing device with a phase shift introduced into one branch. Such an equal phase power combiner will preferably include a resistive element in which undesired signals are dissipated.

It is a further feature of the present invention that the signal divider/combiner is embodied as a quadrature hybrid. Alternatively, the signal divider/combiner maybe embodied as an equal phase power divider/combiner with a phase shift introduced into one branch.

Yet another feature of the present invention is the use of circulators as the first and second routing devices. It is preferable that the first and second routing devices are electrically matched. Alternatively, one may embody the first and second routing devices as directional couplers.

It will be appreciated that any combination of the above noted embodiments of the signal divider, the signal divider/combiner, the signal combiner, and the routing devices may be used. Since two different examples of embodiments are discussed for each of the four devices, one will observe this yields sixteen combinations, the explicit recitation of which is unnecessary as such combinations will be understood.

It is a further feature of the present invention that in the signal routing assembly will deliver a substantial portion of the first transmission signal to the signal routing assembly common port where a substantial portion is in the range of 0.3 dB to 2.5 dB less in amplitude level relative to the first transmission signal when circulators are implemented as signal routing devices. Alternately, one may employ directional couplers as signal routing devices; therefore, a substantial portion is in the range of 0.2 dB to 4.0 dB.

It is a still further feature of the present invention that in the signal routing assembly will deliver a portion of the second transmission signal to the signal routing assembly output where a substantial portion is in the range of 0.3 dB to 2.5 dB less in amplitude level relative to the second transmission signal when circulators are implemented as signal routing devices. Alternately, one may employ directional couplers as signal routing devices; therefore, a substantial portion is in the range of 6.0 dB to 40.0 dB.

It is a still further feature of the present invention that the first and second transmission leakage signals produced by the first transmission signal substantially cancel each other such that a signal appearing at the output of the signal routing assembly is at least 22 dB below the amplitude level of the first transmission signal entering the signal routing assembly when circulators are used as signal routing devices. Preferably, this value will be at least 27 dB. Still more preferably, this value will be at least 37 dB.

Yet another feature of the present invention that the first and second divided transmission signals leaving the signal divider output ports may be amplified to increase the amplitude level of the divided transmission signals.

Yet still another feature of the present invention that the first and second divided transmission signals are modulated as to adjust the signal amplitude and/or phase.

Further features of the present invention include divider/combiner leakage cancellation configurations which compensate for leakage in the divider/combiner arising from the configuration of the signal divider/combiner producing a third transmission leakage signal, at the first divider/combiner port, which is a portion of the second divided transmission output signal and has an amplitude equal to an amplitude of the second divided transmission output signal multiplied by H and a phase shift $-\phi H$ relative to the second divided transmission output signal, and the signal divider/combiner further producing a fourth transmission leakage signal, at the second divider/combiner port, which is a portion of the first divided transmission output signal and has an amplitude equal to an amplitude of the first divided transmission output signal multiplied by H and a phase shift $-\phi H$ relative to the first divided transmission output signal.

A first embodiment of a divider/combiner leakage cancellation configuration includes a reflector device applied at the common port and configured to have a reflection coefficient R to reflect into the common port a portion of the substantial portion of the first transmission signal as a reflected signal of amplitude equal to an amplitude of the substantial portion of the first transmission signal multiplied by R and relative phase shift $-\phi R$. The configuration of the signal divider/combiner is so arranged as to divide the reflected signal into the first and second reflected divided signals having substantially equal amplitudes and a second relative phase shift therebetween, with the first and second reflected divided signals being respectively output at the first and second divider/combiner ports. The first routing device receives the first reflected divided signal and the third transmission leakage signal at the second port and produces, simultaneously at the third port, a first reflected divided output signal and a third transmission leakage output signal. The second routing device receives the second reflected divided signal and the fourth transmission leakage signal at the second port and produces, simultaneously at the third port, a second reflected divided output signal and a fourth transmission leakage output signal. The signal combiner has the first and second combiner inputs respectively receiving the third and fourth transmission leakage output signals, and respectively receiving the first and second reflected divided output signals. The signal combiner is so configured as to combine the first and second reflected divided output signals at the transmission signal output with the third and fourth transmission leakage output signals to effect substantial cancellation of the third and fourth transmission leakage output signals.

The divider/combiner leakage cancellation configuration has the configuration of the reflector device set to have the reflection coefficient R and the relative phase $-\phi R$ so as to effect the substantial cancellation of the third and fourth transmission leakage output signals by having R substantially equal H and $-\phi R$ substantially equal to $(-\phi H - 90 + 2(\phi 8))$ wherein:

$\phi 8$ is a net electrical length of a portion of the common connecting line between said reflecting device and said common port of said signal divider/combiner.

A second embodiment of a divider/combiner leakage cancellation configuration includes a reflector device applied in a connection line between the second port of the first routing device and the first divider/combiner port of the signal divider/combiner and configured to have a reflection coefficient X to reflect into the second port of the first routing device a portion of the first divided transmission output signal as a reflected signal of amplitude equal to an amplitude of the first divided transmission output signal multiplied by X and relative phase shift $-\phi X$. The first routing device receives the reflected signal and the third transmission leakage signal at the second port and produces, simultaneously at the third port a reflected output signal and a third transmission leakage output signal. The second routing device receives the fourth transmission leakage signal at the second port and produces, simultaneously at the third port a fourth transmission leakage output signal. Finally, the signal combiner has the first and second combiner inputs respectively receiving the third and fourth transmission leakage output signals, and the first combiner input receiving the reflected output signal. The signal combiner is so configured as to combine a portion of the reflected output signal at the transmission signal output with the third and fourth transmission leakage output signals to effect substantial cancellation of the third and fourth transmission leakage output signals wherein the configuration of the reflector device is sot to have a reflection coefficient equal to X and the relative phase $-\phi X$ so as to effect the substantial cancellation of the third and fourth transmission leakage output signals.

The second embodiment of a divider/combiner leakage cancellation configuration includes X being set substantially equal to 2H and $-\phi X$ being set substantially equal to $(-\phi H - 90 - 2(\phi 4) + 2(\phi 6))$ wherein:

- $\phi 4$ is a net electrical length of a first connecting line connecting the second port of the first routing device to the first divider/combiner port;
- $\phi 4$ is a net electrical length of a second connecting line connecting the second port of the second routing device to the second divider/combiner port; and
- $\phi 6$ is a net electrical length of a portion of the first connecting line between the reflecting device and the second port of the first routing device.

A third embodiment of a divider/combiner leakage cancellation configuration is constructed and functions as does the second embodiment with the exception that the reflector device is applied in a connection line between the second port of the second routing device and the second divider/combiner port of the signal divider/combiner.

A fourth embodiment of a divider/combiner leakage cancellation configuration is constructed as a combination of the second and third embodiment and has a first reflector device applied in a connection line between the second port of the first routing device and the first divider/combiner port of the signal divider/combiner, and a second reflector device applied in a connection line between the second port of the second routing device and the second divider/combiner port of the signal divider/combiner so as to effect an imbalance resulting in cancellation of the third and fourth transmission leakage output signals.

The reflector devices in the above cancellation configurations are an open stub, a shorted stub, or a reactive component selected from the group consisting of a capacitor and an inductor.

The above, and other objects, features and advantages of the present invention will become apparent from the following description read in conjunction with the accompanying drawings, in which like reference numerals designate the same elements. The present invention is considered to include all functional combinations of the above described features and is not limited to the particular structural embodiments shown in the figures as examples. The scope and spirit of the present invention is considered to include modifications as may be made by those skilled in the art having the benefit of the present disclosure which substitute, for elements presented in the claims, devices or structures upon which the claim language reads or which are equivalent thereto, and which produce substantially the same results associated with those corresponding examples identified in this disclosure for purposes of the operation of this invention. Additionally, the scope and spirit of the present invention is intended to be defined by the scope of the claim language itself and equivalents thereto without incorporation of structural or functional limitations discussed in the specification which are not referred to in the claim language itself.

DETAILED DESCRIPTION OF THE INVENTION

Improvements in transmit to receive isolation for three-port signal routing devices can be provided using a combination of signal dividers with the proper signal phasing and conventional three port components that when properly connected will combine signals at the desired ports and cancel signals at the isolated ports.

Figure 4:
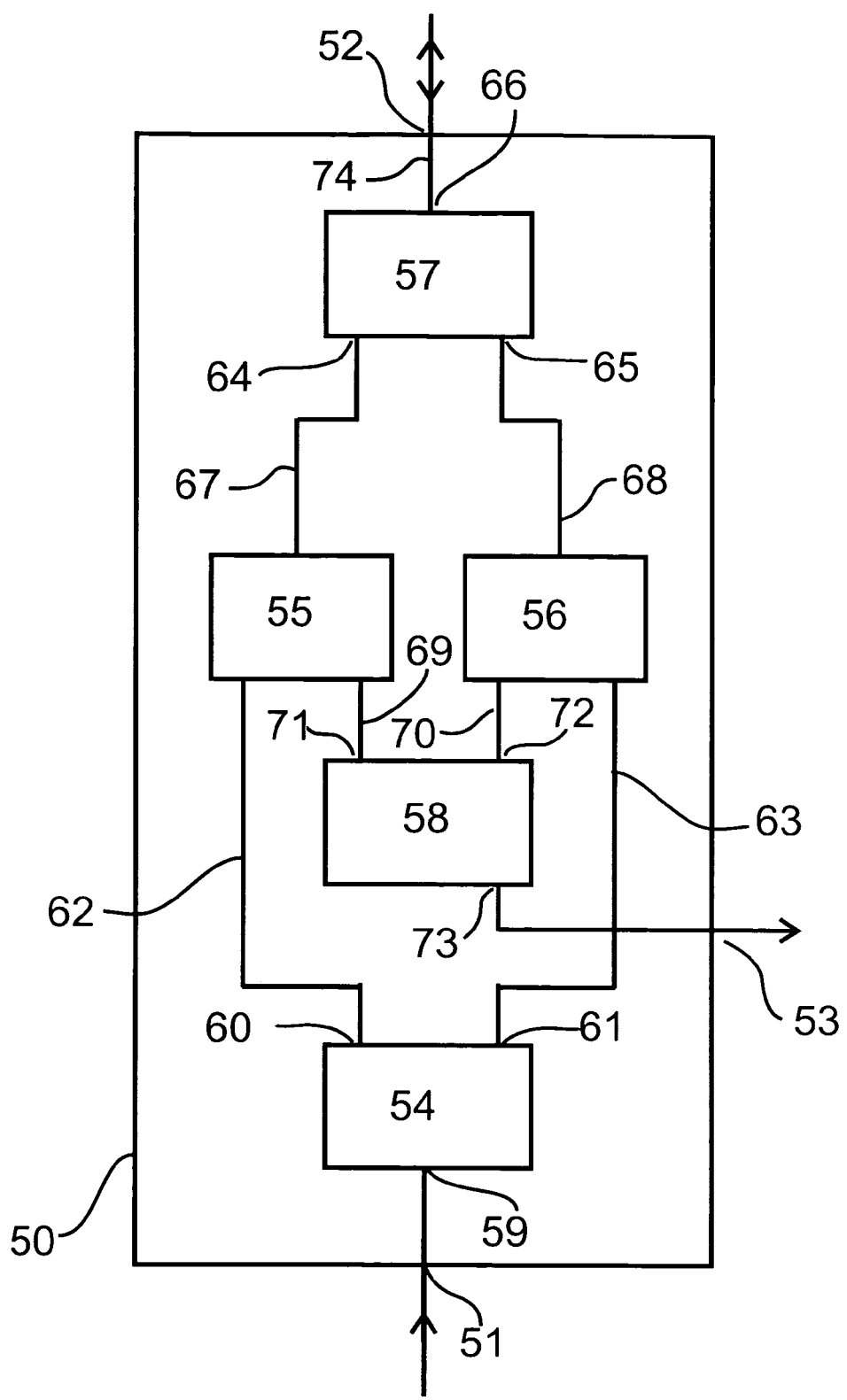
FIG. 4 is a diagram of an embodiment of the routing device.

The generalized construction of the three port signal routing device is shown in FIG. 4. The routing device 50 has one input port 51, one common port 52 and one output port 53. The input signal is received at the input port 51 and routed to the input 59 of a signal divider 54. Input port 51 is typically connected to the local transmitter. Signal divider 54 divides the transmission signal into first and second divided transmission signals output at ports 60 and 61 and having substantially equal amplitudes and a first relative phase shift therebetween. The signal divider 54 is any of a quadrature hybrid, or an equal phase power splitter, e.g., a Wilkinson power splitter, a resistive divider, a T-junction or a reactive T, with a phase shift network applied to one output, or other device so functioning to divide a signal.

The first and second divided signals are routed to first and second routing devices, 55 and 56, each having at least first, second and third ports. The divided signals enter the first ports and are routed to the second ports, the outputs of which are applied to the signal divider/combiner 57. The signal divider/combiner 57 is any of a quadrature hybrid, or an equal phase power splitter, e.g., a Wilkinson power splitter, a resistive divider, a T-junction or a reactive T, with a phase shift network applied to one output, or other device so functioning to combine the signals from the second ports of routing devices 55 and 56. The combined signal exits the divider/combiner 57 at port 66 and is routed to the common port 52. Common port 52 is typically connected to an antenna for signal transmission and reception. Any signal entering the routing device 50 at the common port 52 is routed to port 66 of the signal divider/combiner 57 which divides the received signal into third and fourth divided transmission signals output at ports 64 and 65 and having substantially equal amplitudes and a first relative phase shift therebetween.

The third and fourth divided signals are routed to first and second routing devices, 55 and 56. The divided signals enter the second ports and are routed to the third ports, the outputs of which are applied to the signal combiner 58. The signal combiner 58 is any of a quadrature hybrid, or an equal phase power splitter, e.g., a Wilkinson power splitter, a resistive divider, a T-junction or a reactive T, with a phase shift network applied to one output, or other device so functioning to combine the signals from the third ports of routing devices 55 and 56. The combined signal exits the combiner 58 at port 73 and is routed to the output port 53. Output port 53 is typically connected to the local receiver.

The routing devices, 55 and 56, are preferably matched circulators which provide some degree of isolation between the first ports and the third ports. Alternatively, the routing devices, 55 and 56, are directional couplers.

The first and second routing devices, 55 and 56, are devices intended to transfer a first signal from the first port to the second while simultaneously transferring another second signal entering the second port to the third while preventing the first signal from appearing at the third port. This is the idealized concept of such a routing device. However, in actual embodiments some of the first signal undesirably leaks through to the third port. The amount of this leakage is characterized by the isolation of the device wherein the greater the isolation (measured generally in decibels or dBs) is the higher the isolation value is. For the purposes of this disclosure the routing devices are characterized by transmission coefficients including:

s21 being a transmission coefficient from the first port to the second port;
s32 being a transmission coefficient from the second port to the third; and
s31 being a transmission coefficient from the first port to the third port;

wherein s21 is greater than s31, and s32 is greater than s31.

For the purposes of this disclosure intended signal transfers are considered transfers at functionally operative levels meaning a level at which the signals transferred effect a desired function in the application of the device. Hence, applying this terminology to a simple switch transferring a signal, when the switch is on it would transfer a signal from an input to an output at a functionally operative level. If the switch is off, some leakage may occur resulting in a portion of the signal appearing at the output, this portion of the signal would not be considered to be at a functionally operative level since it would be attenuated to a level not intended to effect operation and not effecting a desired operation.

The signal combiner 58 has first and second combiner inputs and a received signal output connected to the receiver. The first and second combiner inputs are respectively connected to the third ports of the first and second routing devices, 55 and 56, to accept the received signals from the common port 52. The signal combiner 58 introduces a phase shift into signals applied to at least one of the first and second combiner inputs such that the received signals from the common port 52 are combined substantially in phase to produce the received signal at a received signal output which connects to the receiver. Transmission leakage signals which leak from the first ports to the third ports of the routing devices, 55 and 56, are substantially phase shifted relative one another 180 degrees at the received signal output to substantially cancel each other. The signal combiner 58 may be a quadrature hybrid, or an equal phase power splitter, e.g., a Wilkinson power splitter/combiner, a resistive divider, a T-junction or a reactive T, with a phase shift network applied to one of two inputs.

In the routing device 50, connecting lines 62, 63, 67, 68, 69 and 70 interconnect the components and are described in more detail below. It is understood that components may be directly connected to each other and connecting lines omitted where feasible. In the preferred embodiment connecting lines 62 and 63 are electrically matched, connecting lines 67 and 68 are electrically matched and connecting lines 69 and 70 are electrically matched. However, it will be understood that it is not necessary that each of these pairs of lines be matched provided that overall phase shifts of and attenuations of signals are such that the transmitted signals are properly combined for transmission to the antenna and received signals are properly combined for transmission to the receiver. In order to provide adequate transmit channel to receive channel isolation, the overall phase shifts and insertion losses of the connecting lines or equivalents should present an overall phase shift and insertion loss introduced by connecting lines 62, 63, 69 and 70, or their equivalents, present the transmission leakage signals of substantially equal amplitude and phase shifted relative one another about 180 degrees at the received signal output to substantially cancel each other.

In the preferred embodiment discussed below, improved isolation of the routing device 50 is achieved by the effective cancellation of the transmission leakage signal at the received signal output. The phase shifting of these undesired signals to effect cancellation should be such that transmit to receive isolation of at least 30 dB is achieved over a frequency range associated with the system use. More preferably, the insertion losses and phase shifts should effect matching resulting in at least 35 dB isolation over the frequency range. Still more preferably, the insertion losses and phase shifts should effect matching resulting in at least 40 dB isolation over the frequency range. Matching tolerances and effectiveness are discussed below.

It will be additionally appreciated from this disclosure that the phase shifts discussed herein are relative between the respective signals discussed and do not include multiples of 360 degrees electrical length difference that may exist in one connection over another. In other words and as merely an example, for the purposes of this disclosure, unless noted otherwise, a phase shift of 360 degrees or multiples thereof between signals is not considered to be a portion of a relative phase shift. Hence, a signal which is shifted 450 degrees relative another signal, is considered to be shifted 90 degrees for the purposes of this disclosure. Accordingly, it is understood that relative shifts and limitations related thereto recited herein do not exclude the addition of integer multiples of 360 degrees unless specifically stated. While it is preferable that electrical length differences of greater than 360 degrees are not introduced, such difference are not considered to be outside the scope of the present invention.

It will also be appreciated in view of this disclosure that practical production tolerances will result in slight differences in electrical characteristics between the connecting lines and between the first and second routing devices. Tuning elements and/or phase adjustment may be inserted along any connecting line in order to adjust the amplitude and phase of the signal traveling along the line. Tuning the signal may improve the isolation between the transmit channel and receive channel by compensating for any differences between the signal paths and components. Such tuning elements may include stubs or lumped components or other devices as are known by those skilled in the art. Additionally, for the purposes of this disclosure and unless stated otherwise, the connecting lines shown interconnecting components are not intended to exclude insertion of other components in those connecting lines for tuning, amplification or other purposes provided that the cancellation of the transmission leakage signals are achieved at the signal combiner 58.

Figure 5:
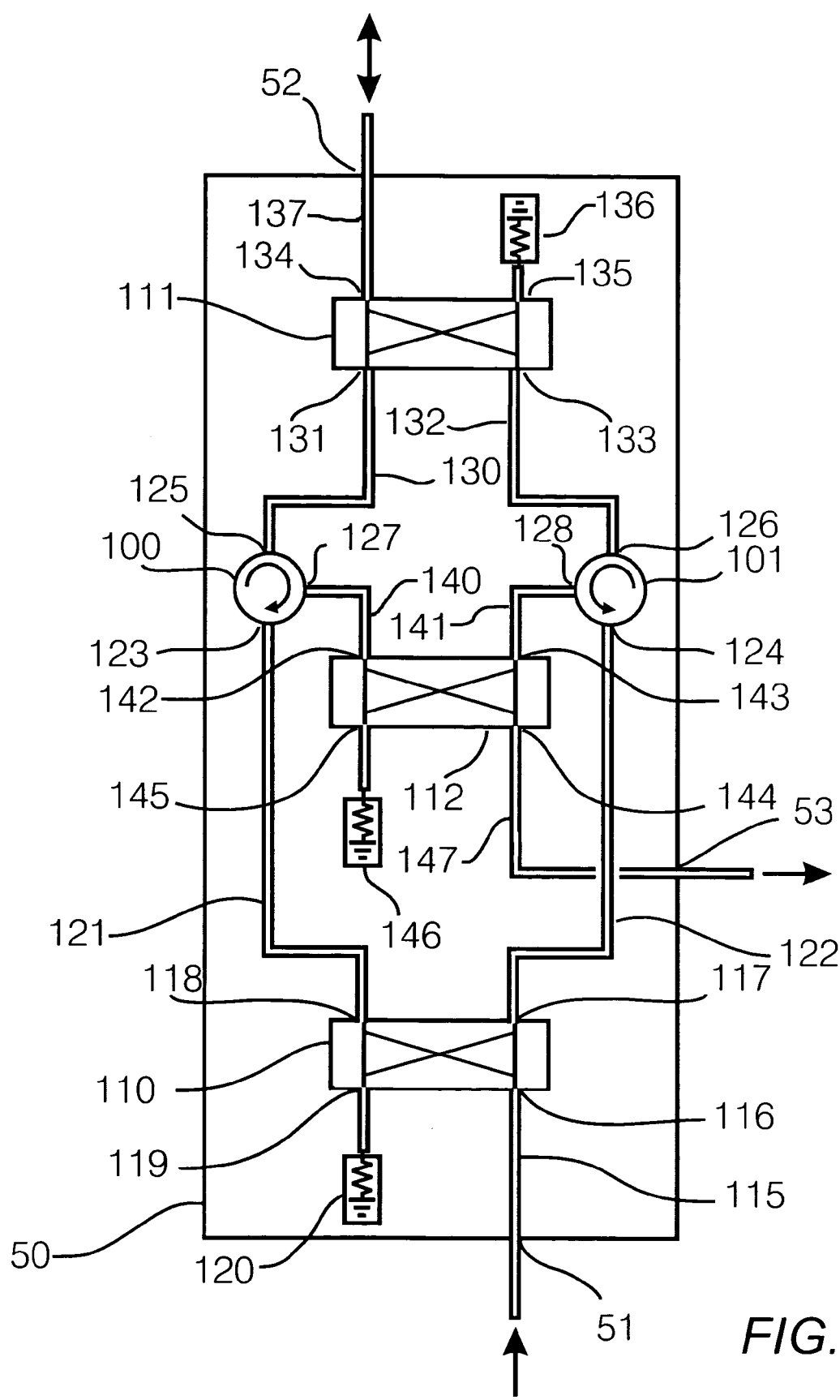
FIG. 5 is a diagram of an embodiment showing details of the routing device.

Referring to FIG. 5, details of a preferred embodiment of the present invention are described herein wherein the generalized internal components of the routing device 50 as disclosed above are embodied in devices used in implementation of the preferred embodiment. It is understood that the above discussion with relation to the generalized components and interconnections shown in FIG. 4 applies to the preferred embodiment shown in FIG. 5.

In FIG. 5 the routing device 50 uses three quadrature hybrids, an input quadrature hybrid 110, a common quadrature hybrid 111 and an output quadrature hybrid 112, and first and second circulators, 100 and 101, connected in such a way as to prevent unwanted transmission energy from the transmitter from entering the receiver. The input quadrature hybrid 110, common quadrature hybrid 111 and output quadrature hybrid 112 need not be of the same construction but the first and second circulators, 100 and 101, are preferably of the same construction and are more preferably electrically matched. If dictated by physical constraints of the application, the first and second circulators, 100 and 101, need not be physically identical, e.g., they may be mirror images or otherwise physically differ, but the first and second circulators, 100 and 101, are preferably electrically similar in both amplitude and phase characteristics.

The transmitter output is connected to the input port 51 of the routing device 50. The receiver input is connected to output port 53 of the routing device 50. The antenna is connected to common port 52. The transmission signal enters input port 51, travels along transmission signal input connecting line 115 and enters an input port 116 of the input quadrature hybrid 110. This signal that enters the input quadrature hybrid 110 is split into two substantially equal amplitude signals with quadrature phase. One half of the signal input leaves port 118 with a relative phase of −90 degrees in relation to another half of the signal input that leaves through port 117. An isolated port 119 of the input quadrature hybrid 110 is terminated with a termination 120 in order to absorb reflected energy that may be entering port 118 and port 117. The termination 120 will also absorb energy that leaks from the input port 116 to the isolated port 119.

The first half of the signal derived from the transmission signal leaves port 118 of input quadrature hybrid 110, propagates down connecting line 121 and enters port 123 of the first circulator 100. Rotation of the first circulator 100 is shown as clockwise which implies that a signal entering port 123 will leave through port 125 of the first circulator 100. This signal continues along connecting line 130 until it enters the port 131 of the common quadrature hybrid 111. The common quadrature hybrid 111 is used for both transmitting signals and receiving signals through the routing device 50. The signal entering port 131 of the common quadrature hybrid 111 is split into two substantially equal amplitude signals with quadrature phase. One half of the signal input leaves port 135 with a relative phase of −90 degrees in relation to another half of the signal input that leaves through port 134.

The second half of the signal derived from the transmission signal leaves port 117 of input quadrature hybrid 110, propagates down connecting line 122 and enters port 124 of the second circulator 101. Rotation of the second circulator 101 is shown as counter-clockwise which implies that the signal entering the port 124 will leave through port 126. This signal continues along feed line 132 and enters port 133 of the common quadrature hybrid 111. The signal entering port 133 of the common quadrature hybrid 111 is split into two substantially equal amplitude signals with quadrature phase. One half of the signal input leaves port 134 with a relative phase of −90 degrees in relation to another half of the signal input that leaves through port 135.

The equal amplitudes and relative phases of the two signals leaving port 134 of common quadrature hybrid 111 result in signal addition of the transmitted signal that enters the transmitter input port 51. The transmitted signal travels down connecting line 137 and leaves the routing device 50 at the common port 52. The equal amplitudes and relative phases of the two transmitted signals leaving port 135 of common quadrature hybrid 111 result in signal cancellation at the output port 135. In the ideal case, no portion of the transmitted signal is absorbed in the termination 136 connected to the common quadrature hybrid 111 at port 135. In the ideal case, the transmitted signal entering the input port 51 of the routing device 50 is first divided and then recombined to leave the routing device 50 at common port 52. In practice, the total transmitted energy leaving port 52 will be reduced by the insertion loss of components and connecting lines used in routing device 50.

The received signal entering the common port 52 of the routing device 50 travels along connecting line 137 and enters port 134 of common quadrature hybrid 111. The signal that enters the common quadrature hybrid 111 is split into two substantially equal amplitude signals with quadrature phase. One half of the signal input leaves port 133 with a relative phase of −90 degrees in relation to another half of the signal input that leaves through port 131. The isolated port 135 of the common quadrature hybrid 111 is terminated with a termination 136 in order to absorb any reflected received energy that may be entering port 131 and port 133. The termination 136 will also absorb energy that leaks from the input port 134 to the isolated port 135.

The first half of the received signal leaving port 133 travels along connecting line 132 and enters the second circulator 101 at the common port 126. Rotation of the second circulator 101 is shown as counter-clockwise which implies that the signal entering the port 126 will leave through output port 128. This signal continues along feed line 141 and enters port 143 of the output quadrature hybrid 112. The signal entering port 143 of the output quadrature hybrid 112 is split into two substantially equal amplitude signals with quadrature phase.

One half of the signal input leaves port 145 with a relative phase of −90 degrees in relation to another half of the signal input that leaves through port 144.

The second half of the signal derived from the received signal leaves port 131 of common quadrature hybrid 111, propagates down connecting line 130 and enters the common port 125 of the first circulator 100. Rotation of the first circulator 100 is shown as clockwise which implies that the signal entering the common port 125 will leave through port 127. This signal continues along feed line 140 and enters port 142 of the output quadrature hybrid 112. The signal entering port 142 of the output quadrature hybrid 112 is split into two substantially equal amplitude signals with quadrature phase. One half of the signal input leaves port 144 with a relative phase of −90 degrees in relation to another half of the signal input that leaves through port 145.

The equal amplitudes and relative phases of the two signals leaving port 144 of output quadrature hybrid 112 result in signal addition of the received signal. The received signal travels down connecting line 147 and leaves the routing device 50 at the receive port 53. The equal amplitudes and relative phases of the two signals leaving port 145 of output quadrature hybrid 112 result in signal cancellation at the output port 145. In the ideal case, no received signal entering the common port 52 of the routing device 50 is absorbed in the termination 146 connected to the output quadrature hybrid 112 at output port 145. In the ideal case, the received signal entering the common port 52 of the routing device 50 is first divided by common quadrature hybrid 111 and then recombined by output quadrature hybrid 112 to leave the routing device 50 at receive port 53. In the practical the total received energy leaving receive port 53 will be reduced by the insertion loss of components and connecting lines used in routing device 50.

It will be understood by those skilled in the art in view of this disclosure that the rotation of first circulator 100 and second circulator 101 in FIG. 5 was chosen for clarity in the diagram and that the rotation direction of the first and second circulators, 100 and 101, can be changed as long as the interconnecting lines are appropriately arranged to route the signals as described above.

The routing device 50 is designed to provide isolation between the transmit channel to the receive channel from any portion of the transmit signal that may couple through the first circulator 100 and second circulator 101. In the ideal case, any signal entering the input port 123 will leave through common port 125 and no portion of the transmitted signal will be seen at output port 127. In practice the first circulator 100 has limited amount of isolation between the input port 123 and output port 127. This undesired coupling of energy from the input port 123 to the output port 127 is caused predominately by practical limitations in the circulator design and mismatch between common port 125 and connection to the connecting line 130. The portion of the transmitted signal that couples through first circulator 100 will travel along connecting line 140 and enter the output quadrature hybrid 112 at the input port 142. The coupled signal is split into two equal amplitude signals in quadrature phase. One half of the signal is delivered to the isolated port 145 and one half is delivered to the output port 144.

In the ideal case any signal entering the input port 124 will leave through common port 126 and no portion of the transmitted signal will be seen at output port 128. In practice the second circulator 101 has limited amount of isolation between the input port 124 and the output port 128. This undesired coupling of energy from the input port 124 to the output port 128 is caused predominately by practical limitations in the circulator design and mismatch between common port 126 and connection to the connecting line 132. The portion of the transmitted signal that couples through second circulator 101 will travel along connecting line 141 and enter the output quadrature hybrid 112 at the input port 143. The coupled signal is split into two equal amplitude signals in quadrature phase. One half of the signal is delivered to the isolated port 145 and one half is delivered to the output port 144.

It can be shown that undesired coupled signals through first circulator 100 and second circulator 101 will result in two equal amplitude signals appearing at the isolated port 145 and two equal amplitude signals at output port 144. It can also be shown that the phase relationship between these signals will result in signal addition at the isolated port 145 and signal cancellation at output port 144. In this way, any energy that is coupled through first circulator 100 and second circulator 101 will be terminated by termination 146 and no undesired coupled energy will be delivered to output port 144. Output port 144 can be connected to the receive channel of a full duplex transceiver thus providing high isolation between the transmit channel to the receive channel.

As previously mentioned, it is expected that circulators 100 and 101 have approximately the same electrical performance in both amplitude and phase in order to maintain the quadrature phase relationship developed by the input quadrature hybrid 110. Tuning elements and/or phase adjustment may be inserted along any feed line in order to adjust the amplitude and phase of the signal traveling along the line. Tuning the signal may improve the isolation between the transmit channel and receive channel by compensating for any differences between the signal paths. It is also found that tuning elements, such as small stubs, placed on connecting line 130 and/or connecting line 132 and placed in close proximity to circulator common port 125 and/or circulator common port 126 can greatly improve the amount of isolation between the transmit and receive channels. The tuning element or elements achieve a better electrical match between the two circulators.

Figure 6:
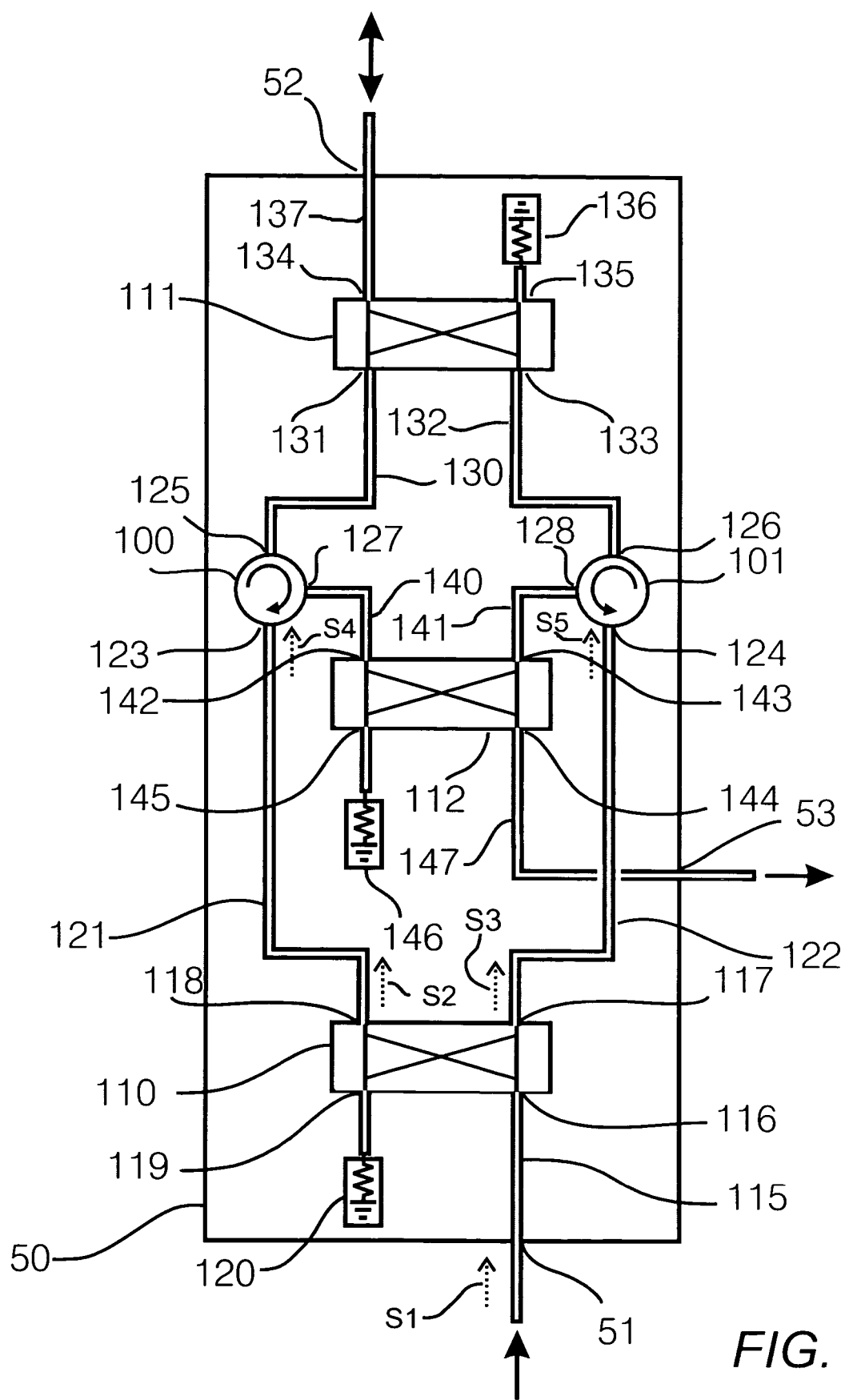
FIG. 6 is a diagram of an embodiment showing signal paths proceeding from the transmitter to the circulators.

FIG. 6 shows the routing device 50 for signals that travel from the transmitter to the first circulator 100 and the second circulator 101. The complex input signal S1 to the routing device 50 will be assumed to have voltage amplitude equal to 1 and phase equal to 0 degrees. TABLE 1 summarizes the amplitudes and relative phases for the signals traveling from the input port 51 up to the first and second circulators 100 and 101 respectively. As shown in FIG. 6, the input signal S1 enters the input quadrature hybrid 110 at port 116 and the signal is divided into two equal amplitude signals with quadrature phase. The signal S2 leaving port 118 has amplitude equal to 1/sqrt(2) and relative phase equal to −90 degrees and the signal S3 leaving port 117 has amplitude equal to 1/sqrt(2) and relative phase equal to 0 degrees. The input quadrature hybrid 110 can also be configured with these two connections swapped. In this case, the connections to the other two quadrature hybrids would also need to be swapped in order to maintain the same performance. The two output signals from the first quadrature hybrid 110 travel along connecting lines 121 and 122 respectively. The length of transmission line for connecting lines 121 and 122 introduce an additional phase shift of −ϕ1 to each signal S4 and S5.

TABLE 1

| Signal | Amplitude | Phase |
|---|---|---|
| S1 | 1 | 0 |
| S2 | 1/sqrt(2) | −90 |

TABLE 1-continued

| Signal | Amplitude | Phase |
|---|---|---|
| S3 | 1/sqrt(2) | 0 |
| S4 | 1/sqrt(2) | −90 − φ1 |
| S5 | 1/sqrt(2) | −φ1 |
| S16 | B/sqrt(2) | −90 − φ1 − φB |
| S17 | B/sqrt(2) | −φ1 − φB |
| S18 | B | −90 − φ1 − φB − φ3 |
| S19 | 0 | |

Figure 7:
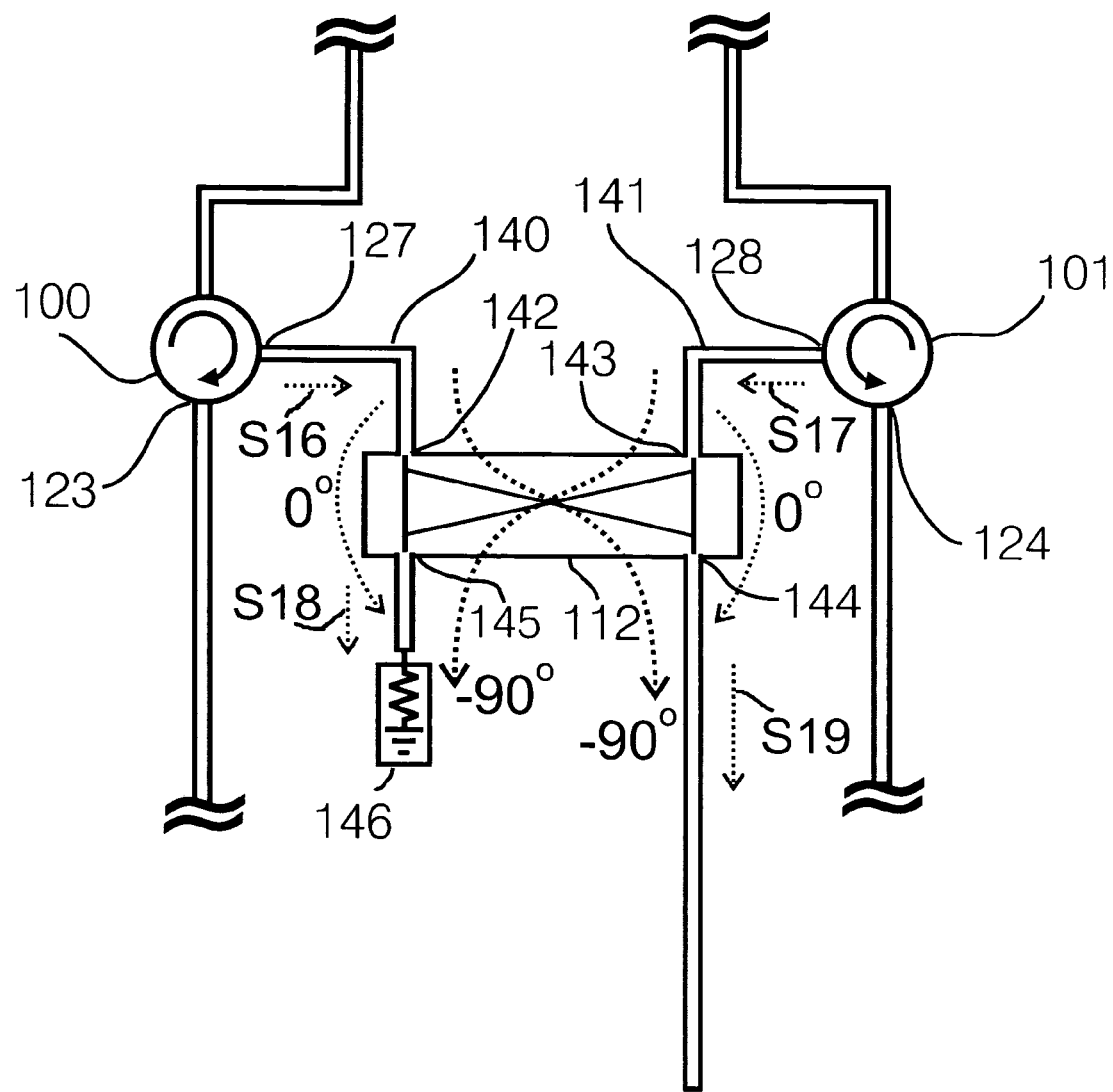
FIG. 7 is a diagram of an embodiment showing signal paths proceeding from the circulators to the receiver and termination.

FIG. 7 shows the signal paths for the coupled or leakage signals from the input port 123 and port 124 of circulators 100 and 101 respectively to the output ports 127 and 128. The upper and lower sections of the routing device 50 are not shown for clarity. For this analysis, it is assumed that any undesired signal that couples through the circulator will experience a change in amplitude equal to B and a phase shift equal to −φB. The signal S16 from the output port 127 will have an amplitude equal to B/sqrt(2) and relative phase of (−90−φ1−φB) degrees. The signal S17 on the output port 128 will have amplitude equal to B/sqrt(2) and relative phase of (−φ1−φB) degrees. These signals travel along feed lines 140 and 141 respectively. The length of transmission line for connecting lines 140 and 141 introduce an additional phase shift of −φ3 to each signal. Each input signal to the output quadrature hybrid 112 is divided in half. A relative phase shift of −90 degrees is introduced into the signal passing from the port 143 over to the port 145. A relative phase shift of −90 degrees is introduced into the signal passing from the port 142 over to the port 144. A relative phase shift of 0 degrees is introduced into the signal passing from the port 142 over to the port 145. A relative phase shift of 0 degrees is introduced into the signal passing from the port 143 over to the port 144. Vector addition of the output signals at port 144 of the quadrature hybrid 112 will show signal cancellation resulting in output amplitude S19 of 0. Vector addition of the output signals at port 145 of the quadrature hybrid 112 will show signal addition resulting in output amplitude S18 of B. Output port 144 is connected to the receive channel to prevent undesired circulator coupling or leakage from entering the receiver. Port 145 is connected to termination 146 in order to terminate the undesired energy that coupled through the circulators. In some systems, the energy at the terminated port 145 can be measured and used as an indication of the operation of the circulators. For example, if a large signal level is measured at the port 145 then it may indicate a problem with the one or both circulators, as most of the signal is being coupled across the circulator and not properly transmitted through the antenna into the surrounding environment.

The above derivation assumed that the two signal paths were balanced in both relative amplitude and relative phase in order that signal cancellation would occur at the output port 144 of the routing device 50. Tolerances in the components and connecting lines may result in a degradation of the transmit-to-receive isolation provided by the routing device 50. A study of the amplitude balance and phase balance for the signals entering the quadrature hybrid 112 can show what level of transmit-to-receive isolation is achievable in the routing device 50. Also note, that the quadrature hybrid 112 or other power combiner may also have relative amplitude and phase imbalance that may reduce the isolation performance. In this case, the tolerance within the quadrature hybrid 112 or other power combiner can be considered as part of the following analysis. TABLE 2 shows the required amplitude and phase balance between two signal paths that would result in a 30 dB and 40 dB isolation between the transmit channel to receive channel. TABLE 2 lists the required relative amplitude and phase tolerance as a function of the signal level of the undesired coupling. It is assumed that the amplitude and phase imbalances are created by differences in the insertion loss and electrical lengths of the connecting lines, electrical variations between the ports of the power dividers and combiners and electrical variations between the pair of circulators. For example, circulators that have a poor isolation such as 10 dB, would require tighter tolerance in the balance between the two combined signals in order to achieve a high isolation between transmit and receive channels.

As a numerical example using the TABLE 2, if the required transmit-to-receive isolation is 30 dB using the routing device 50 and the circulator isolation having a value of 15 dB, then the relative amplitude balance between the two paths would need to be within the range of +3.8 dB/−1.6 dB. This analysis assumes that the phase balance is ideal. Using this same example but with an ideal amplitude balance, the relative phase balance between the two paths would be +/−20.5 degrees. For the signal routing assembly having both amplitude and phase imbalances, a Monte Carlo analysis is one technique that can be used to estimate the range of tolerances required to achieve a certain level of isolation between the transmit channel to receive channel. For example, using a circulator with isolation of 10 dB would require a relative amplitude balance of +1.2 dB/−0.8 dB and a relative phase balance +/−10 degrees in order to achieve approximately 30 dB isolation between the transmit channel to receive channel. There are other combinations of amplitude and phase tolerances that can achieve this isolation value.

In practice, amplitude and phase adjustments within the signal routing assembly 50 can be implemented to improve the final isolation of the network. In this case, amplitude and phase shift tuning, using such components as attenuators and lengths of transmission lines, can adjust the balance between the two signal paths in order to optimize the isolation between the transmit channel and receive channel. In addition, proper selection of the components, and when using a printed circuit board, symmetrical layout of the connecting lines, can result in amplitude and phase balances within +/−0.3 dB and +/−5 degrees with minimal tuning at an operation frequency of 915 MHz. These tolerances can achieve approximately a 35 dB isolation between transmit to receive channels.

TABLE 2

| Undesired Signal Level (dB) | Amplitude Balance (dB) | Phase Balance (deg) |
|---|---|---|
| Transmit to Receive Isolation = 30 dB | | |
| 5 | +1/−0.9 | +/−6.4 |
| 10 | +1.9/−1.6 | +/−11.4 |
| 15 | +3.8/−2.6 | +/−20.5 |
| 20 | +8.7/−4.2 | +/−36.9 |
| 25 | +inf/−6.5 | +/−68.4 |
| Transmit to Receive Isolation = 40 dB | | |
| 5 | +/−0.3 | +/−2.0 |
| 10 | 0.6/−0.5 | +/−3.6 |
| 15 | +1/−0.9 | +/−6.4 |
| 20 | +1.9/−1.6 | +/−11.4 |
| 25 | +3.8/−2.6 | +/−20.5 |

From the above analysis and data, it will be understood by those skilled in the art that amplitude levels that are exactly the same or phase differences that are exactly 180 degrees, while desirable for the practice of this invention, are not required for the practice of this invention. As indicated in the above Table 2, the amplitude balance and phase balance required to practice the invention will depend on the desired transmit to receive channel isolation and the undesired signal level produced by the transmission leakage through the circulators. The undesired signal levels are presented in terms of attenuation of the transmission input signal, i.e., the attenuation of the transmission signal passed from port one of the routing devices, 100 and 101, which results in the undesired signal appearing at the combining assembly. Thus, for the present invention, the requirements for approximately the same level signals and approximately the desired phase shift, e.g., 180 degrees, are understood to mean within tolerances yielding a desired isolation based on the characteristics of the signal routing devices, 100 and 101. Such tolerances are illustrated in the Table 2 for transmit to receive channel isolation levels of 30 dB and 40 dB. The undesired signal referred to is the leakage transmission signal from one of the routing devices, 100 and 101, the value in dB represents the attenuation ratio relative to the divided transmission signals at the first ports of the routing devices, 100 and 101, for the leakage transmission signal.

In practice the amount of cancellation in the signal combiner 112 varies with the matching of the signal. It is considered that the undesired leakage signals substantially cancel when the receiver front end functions adequately. Depending on the application, the amount of cancellation necessary will vary on the amount of leakage in the routing devices 100 and 101. In applications such as RFID tag excitation and reading, it may be acceptable that the first and second leakage signals substantially cancel each other such that a signal appearing at the received signal output of the signal combiner 112 which is produced by the transmission signal, and does not include any signal received by the antenna by reception of radiation, is at least 20 dB below a level of the desired transmission signal. Preferably, such a signal is 25 dB down, more preferably such a signal is 30 dB down, and still more preferably such a signal is 40 dB down. It should further be noted that this cancellation is achieved routing the signals using passive components without employing active cancellation.

Figure 1:
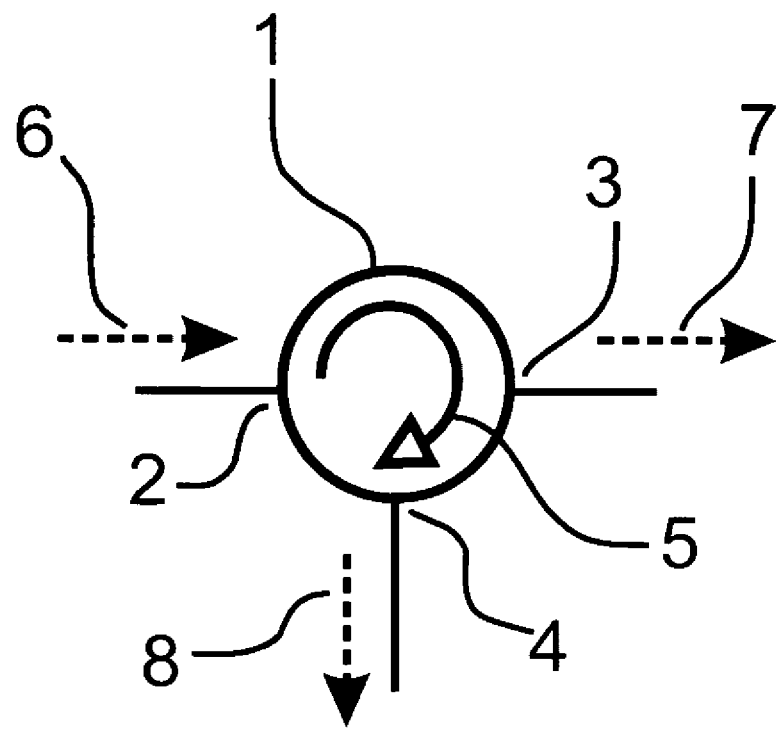
FIG. 1 is a prior art diagram of a circulator showing signal paths for desired and undesired signals that pass through the device.
Figure 2:
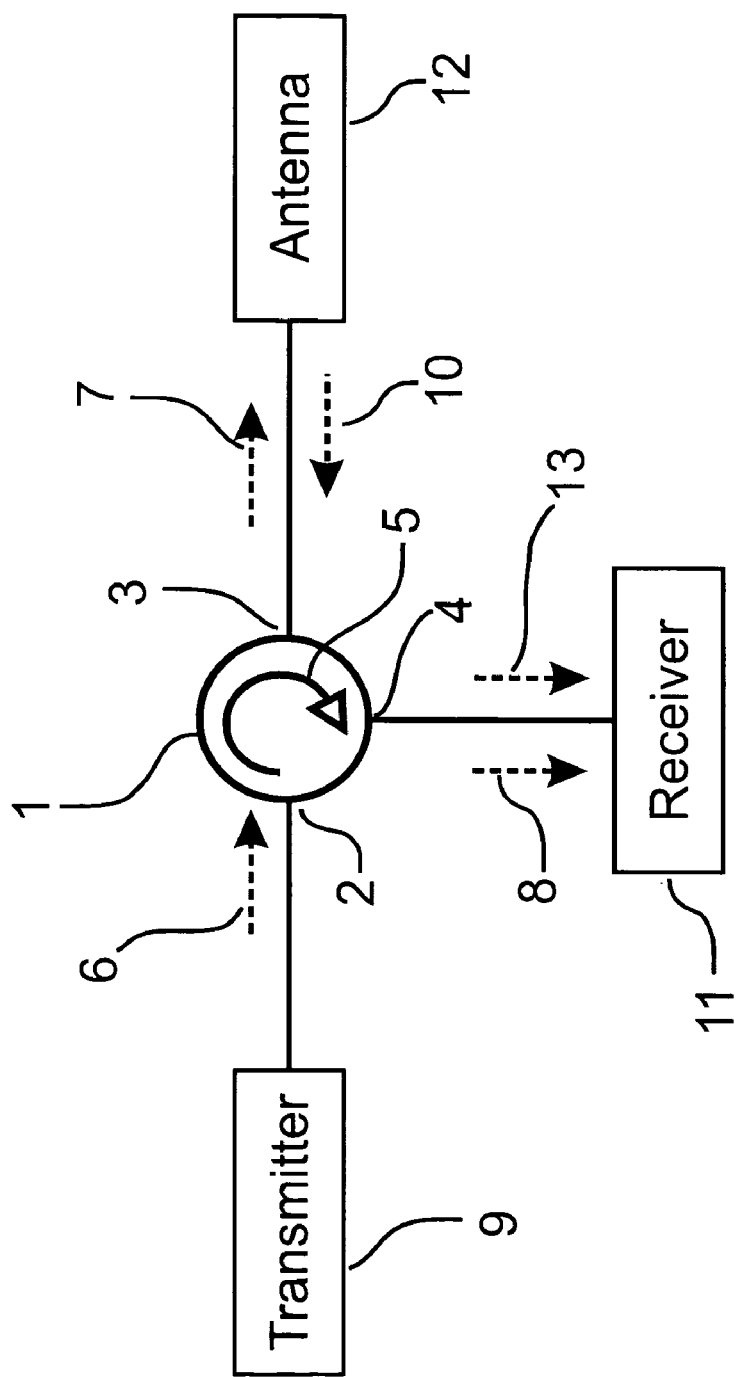
FIG. 2 is a prior art diagram of a complete transceiver system using a circulator to route signals from the transmitter to the antenna and from the antenna to the receiver. Also shown is the undesired signal entering the receiver.
Figure 3:
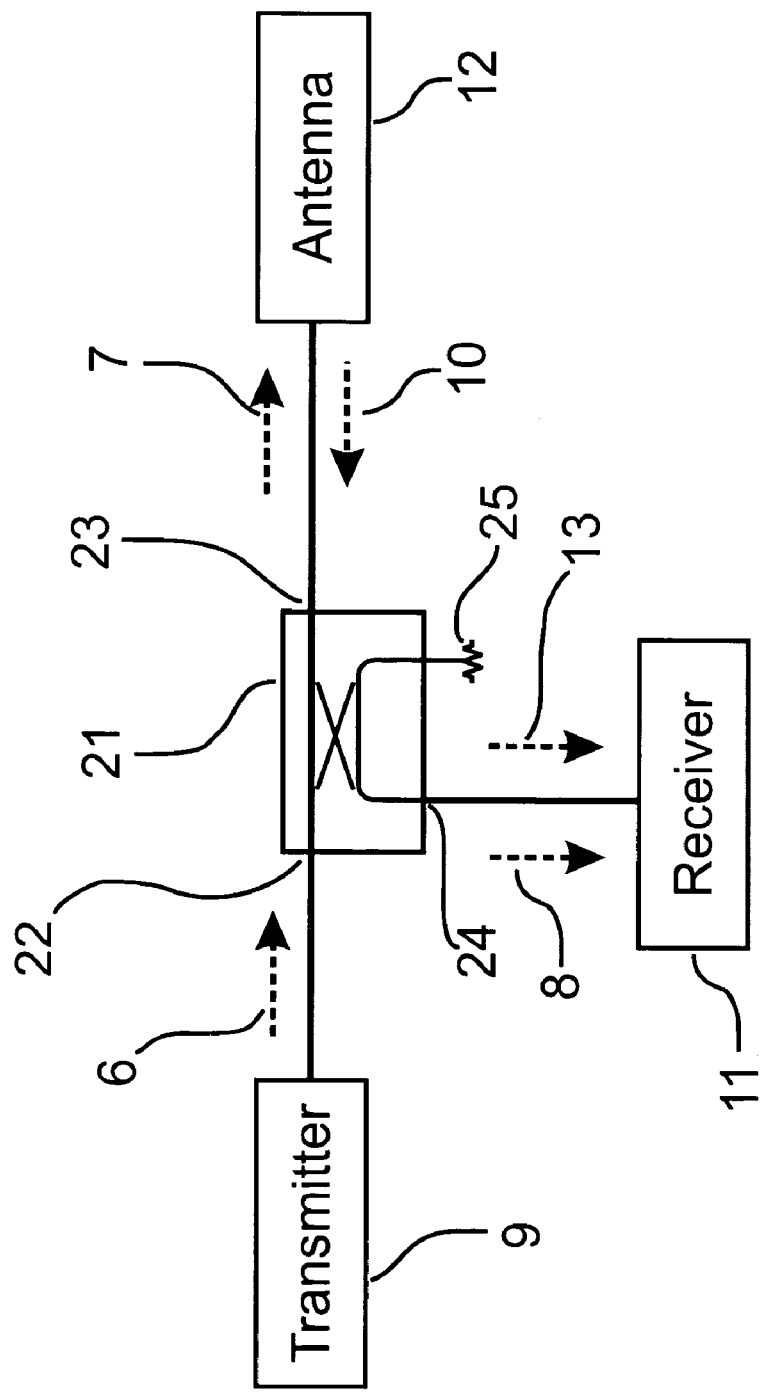
FIG. 3 is a prior art diagram of a complete transceiver system using a directional coupler to route signals from the transmitter to the antenna and from the antenna to the receiver. Also shown is the undesired signal entering the receiver.
Figure 8:
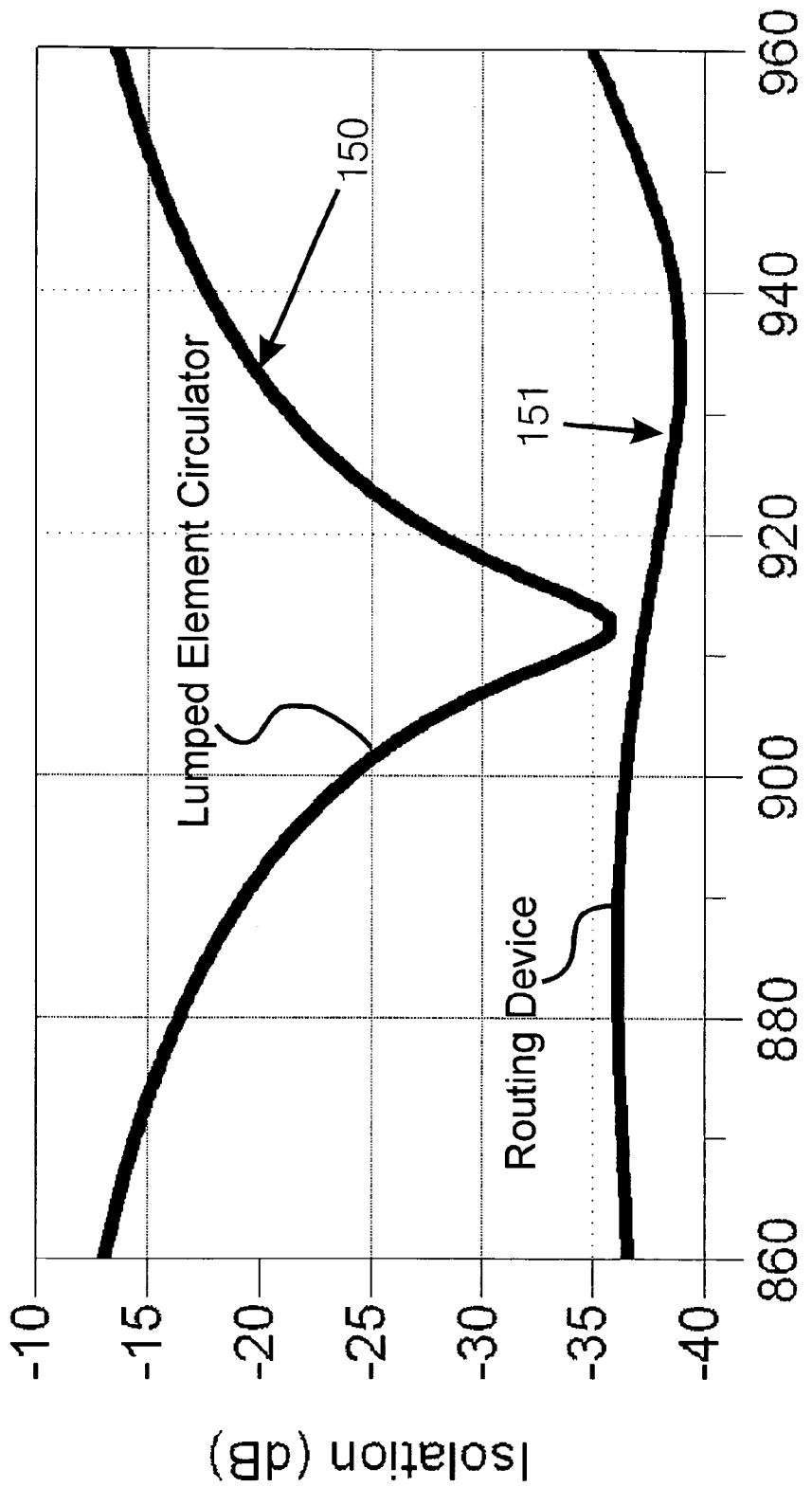
FIG. 8 is a graph of measured results for the isolation between the transmit channel to the receive channel.

FIG. 8 shows two measured results for transmit channel to receive channel isolation. The upper curve 150 in FIG. 8 is the isolation for the standard lumped element type circulator as shown in FIG. 1. The lumped element circulator was manufactured for best performance in the 902 MHz to 928 MHz frequency range. This measurement was made by measuring the difference in the leakage signal level 8 relative to the input signal 6 as shown in FIG. 1. A routing device was fabricated using a printed circuit etched onto a FR-4 dielectric substrate. The routing device was fabricated with two lumped element circulators of the same type used in the first measurement 150 shown on FIG. 8. The circulators were manufactured for best performance in the 902 MHz to 928 MHz frequency range. The lower curve 151 in FIG. 8 was measured using the preferred embodiment of routing device 50 as shown in FIG. 5. This measurement was made by measuring the signal level between receive channel output 53 relative to the signal level at the transmit channel input 51. It is shown from the measured results that the routing device 50 provides a much higher isolation over a much wider range of frequencies. For example, the measured worst case isolation over the operating band of 860 MHz to 960 MHz is 13 dB for the standard lumped element circulator and 35 dB using the preferred embodiment for the routing device 50.

Figure 9:
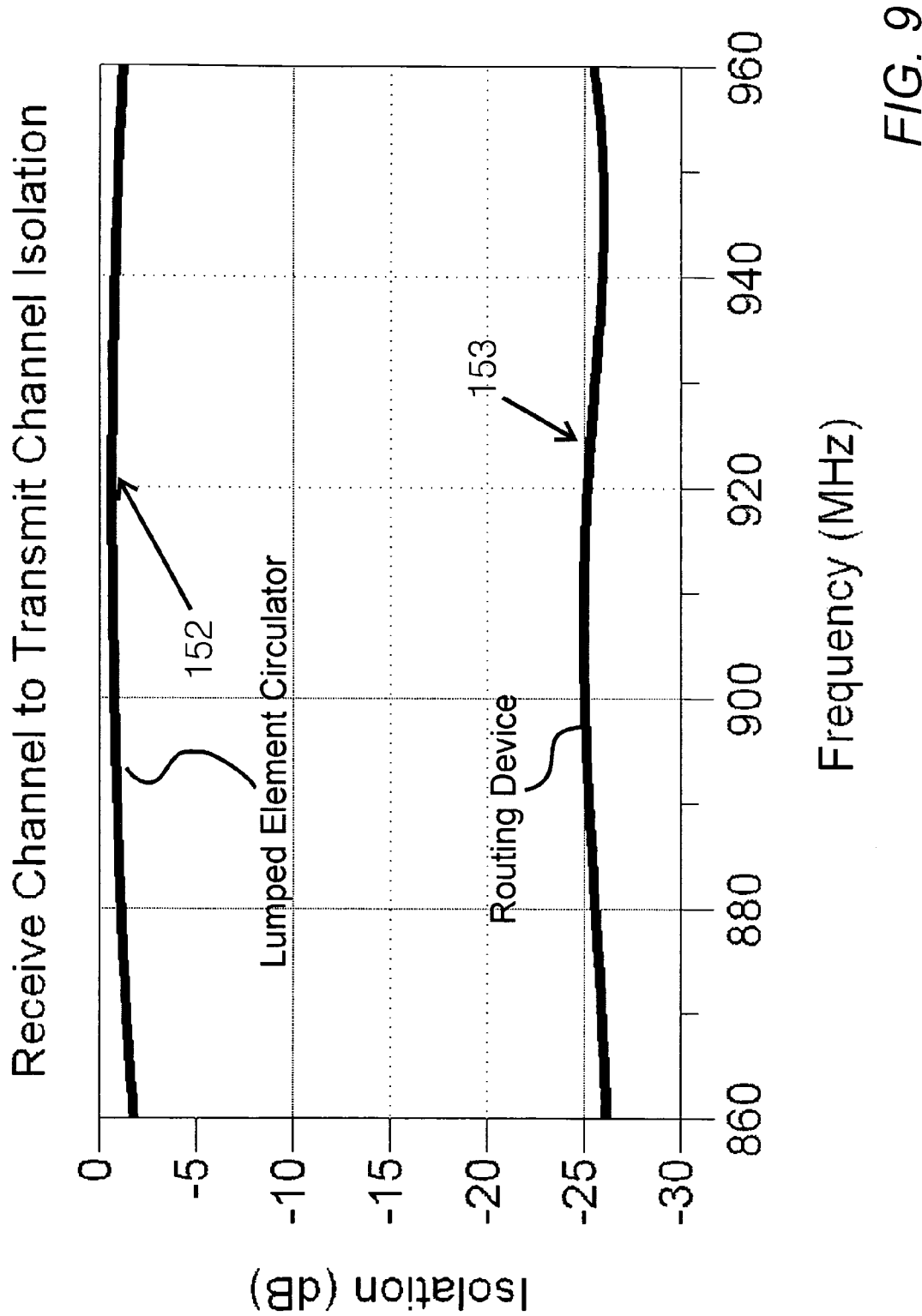
FIG. 9 is a graph measured results for the isolation between the receiver channel to the transmit channel.

FIG. 9 shows the measured results for the receive channel to transmit channel isolation. The upper curve 152 shows the measured isolation for the standard lumped element circulator as shown in FIG. 1. The standard circulator provides little isolation (<1 dB) between the receive channel to transmit channel. The lower curve 153 is the measured isolation using the preferred embodiment of the routing device 50 as shown in FIG. 5. As shown in FIG. 9, the receive channel to transmit channel isolation is greater than 25 dB over the 860 MHz to 960 MHz frequency range.

Figure 10:
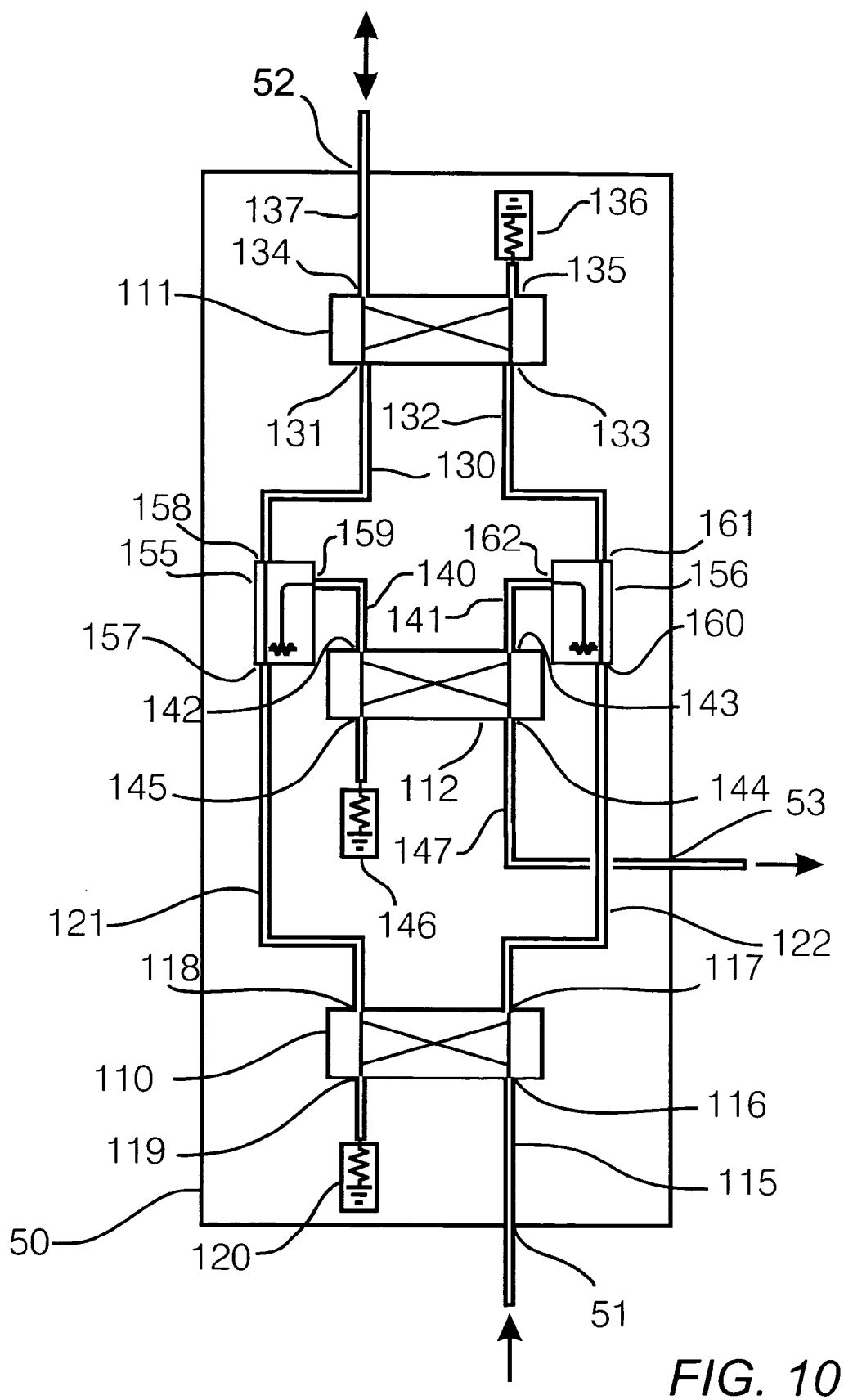
FIG. 10 is a diagram of an embodiment of the routing device using directional couplers as the routing device.

Another embodiment of the present invention makes use of directional couplers in place of the circulators to route the signals to and from the common antenna port through the routing device 50. FIG. 10 shows the routing device 50 implemented with directional couplers 155 and 156. The mathematical analysis using directional couplers in place of circulators follows the same derivation as shown in FIG. 6 and FIG. 7. One of the key differences when using directional couplers in place of circulators is an additional reduction in the received amplitude of the signals as they pass through the directional coupler moving from connecting lines 130 and 132 to connecting lines 140 and 141 respectively as shown on FIG. 10. Also note that practical directional couplers have undesired leakage paths between the ports 157 to port 159 and port 160 to port 162. As in the case using circulators, the routing device 50 is capable of canceling the undesired leakage energy at the output port 144 and allowing this energy to be absorbed in the termination 146.

Another embodiment of the present invention replaces the quadrature hybrids 110, 111 and 112 in FIG. 5 and FIG. 10 with other types of power division networks as long as the output signals from these devices maintain the amplitude and the relative phase relationships required for proper operation of the routing device 50. One skilled in the art will recognize in view of this disclosure other types of power dividers that have equal amplitude split with a 90-degree phase difference between the outputs that can be used to practice this invention such as the branchline coupler, overlay coupler, edge-coupled coupler, lumped element coupler and Lange coupler. Likewise, other types of power division networks with equal amplitude but equal phase between the outputs may be employed to practice the present invention. These equal phase dividers include the Wilkinson tee, resistive divider and T-junction or reactive tee. Using one of these equal amplitude-equal phase dividers in place of quadrature hybrid 110, 111 and/or 112 requires the addition of a 90-degree phase shift network on one side of the divider output.

Figure 11:
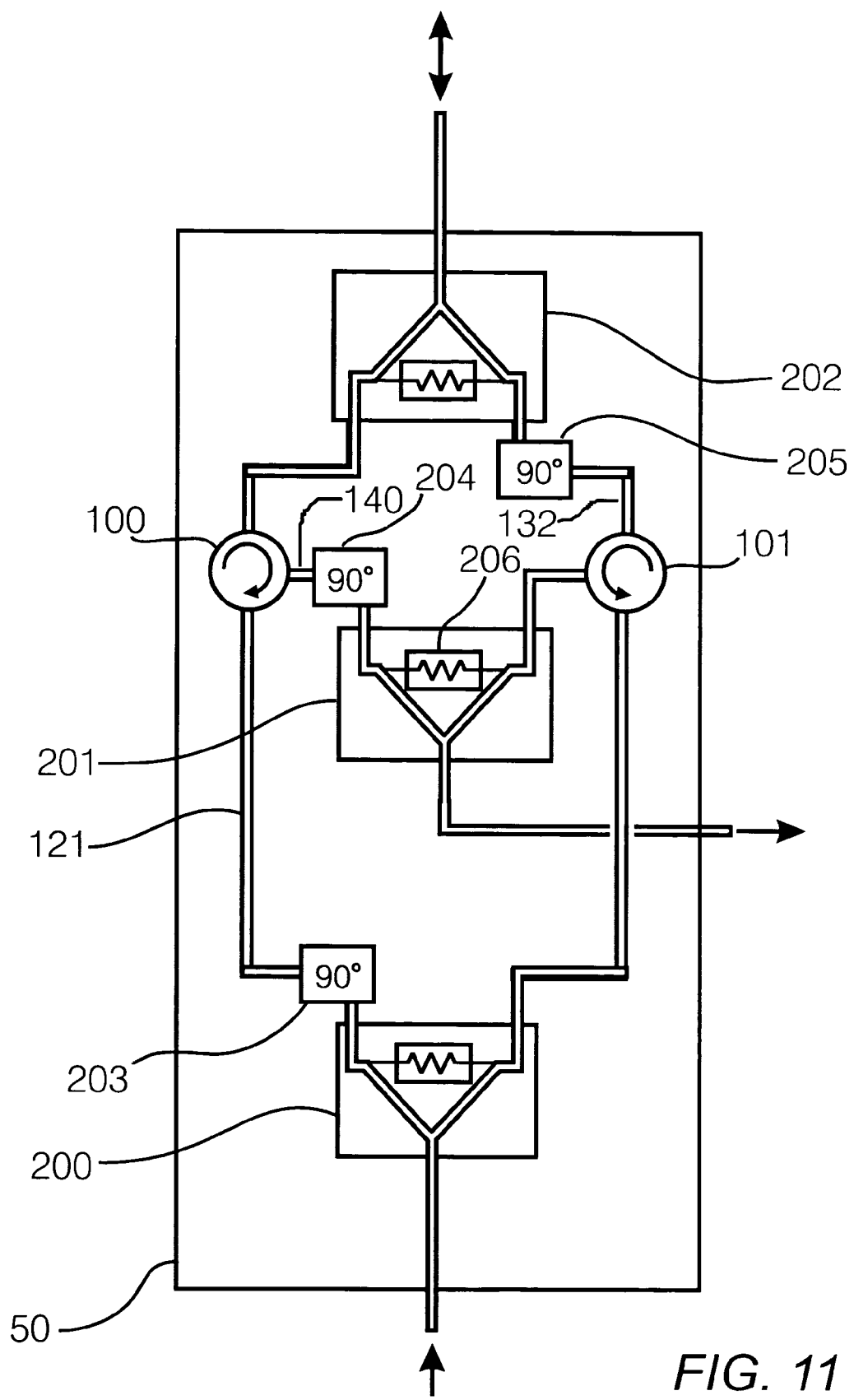
FIG. 11 is a diagram of an embodiment of the routing device using equal-phase power dividers and equal-phase power combiners that include a phase shift network.

For example, FIG. 11 shows another embodiment of the routing device 50 using Wilkinson dividers 200, 201 and 202 in place of the three quadrature hybrids 110, 112 and 111 respectively as shown on FIG. 5. To create the required quadrature signal, additional 90-degree phase shifts 203, 204 and 205 are added to connecting lines 121, 140, 132 respectively to create the necessary conditions for isolating the transmit signal from entering the receive channel. The Wilkinson tee divider or any other type of equal phase power divider/combiner in combination with a 90-degree phase shift can also be used within the routing device 50. The termination 206 is used to absorb the signals that leak or couple through circulators 100 and 101. Additionally, it is realized that different combinations of divider types can be used in the routing device 50 to provide isolation between the transmit channel and receive channel.

One skilled in the art will understand in light of this disclosure that other types of power divider networks are usable in the practice of this invention that result in a variety of phase differences between the divider's output signals. For example, the ring hybrid, or "rat-race", results in a power division with a 180-phase difference between two of the output ports. Here again, a phase shift network will be required to properly adjust the phase so that signals that leak or couple through the two circulators or directional couplers will be isolated from the receive channel.

The routing device of the present invention may also include amplifiers in the connecting lines to up to the circulators or directional couplers increase the amplitude level of the transmitted signal. These amplifiers should provide approximately an equal amount of amplification to the input signals and approximately an equal amount of phase shift.

Figure 12:
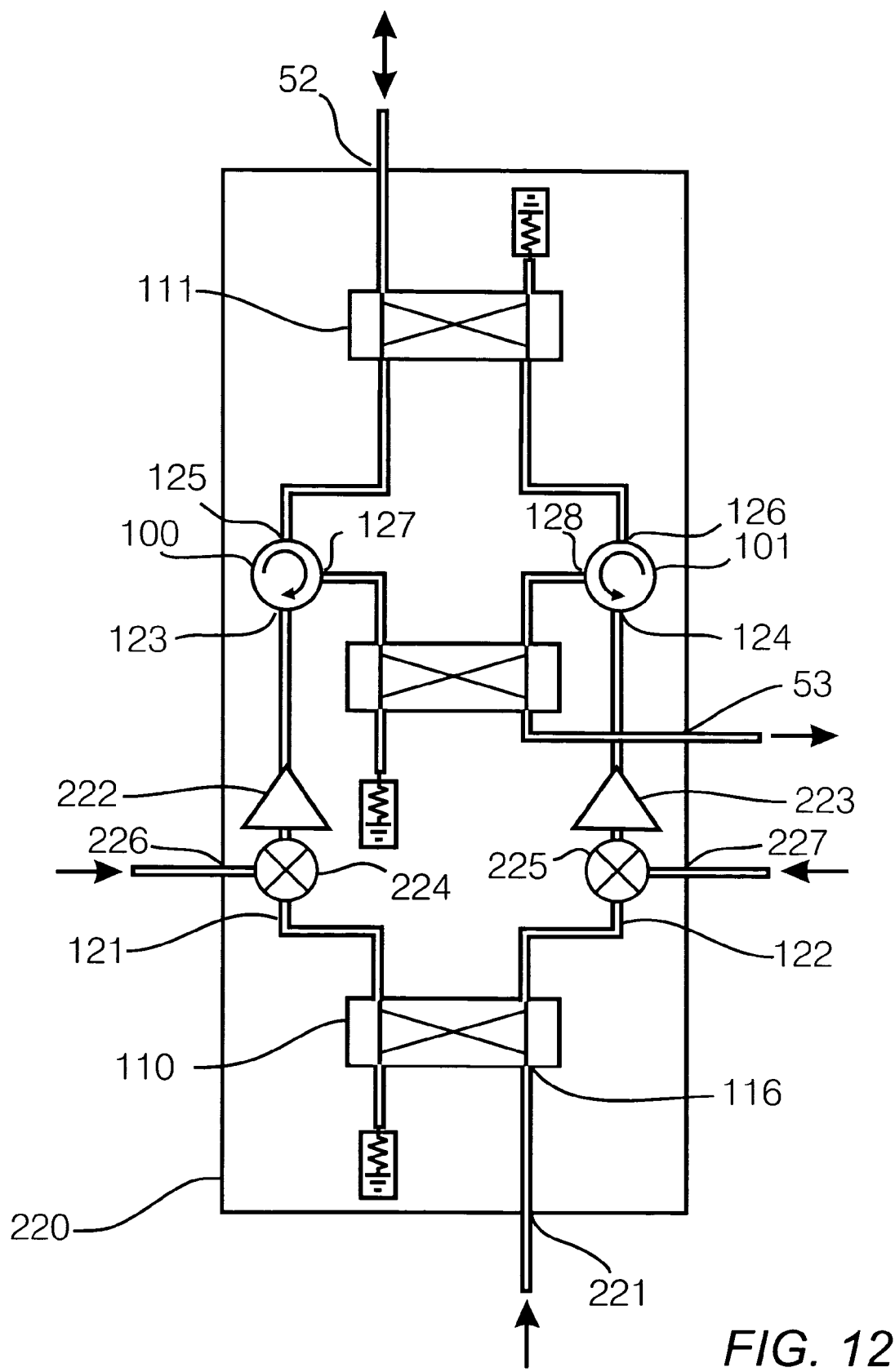
FIG. 12 is a diagram of an embodiment of the routing device including modulators and amplifiers to modulate and amplify the input transmission signal.

The routing device of the present invention may also include modulators in the connecting lines to allow the routing device to operate as a transmit modulator as shown in FIG. 12. For example, modulators 224 and 225 are placed along connecting lines 121 and 122 respectively. Data signals are applied to the data input ports 226 and 227 and the transmission signals flowing on connecting lines 121 and 122 are modified by the modulators 224 and 225. The modulators 224 and 225 can be mixers, switches, variable attenuators, variable amplifiers or any device that can modify the amplitude and/or phase of the transmission signal. In the typical operation of an RFID system using backscatter communication, the reader modulation is applied during forward-link transmission from the RFID reader to the RFID tag. During reverse-link communication, the RFID reader transmitter is active but typically not modulated with data during signal reception from the tag to the reader. In this case, the routing device 220 provides isolation between the active transmitter carrier signal and receiver input. The routing device 220 may also include amplifiers in the connecting lines to increase the amplitude level of the transmitted signal to operative levels as shown in FIG. 12. For example, amplifiers 222 and 223 are placed along connecting lines 121 and 122 respectively.

The routing device of the present invention is optionally operated in full duplex mode with different transmit and receive RF carrier frequencies. In this way, cancellation of the transmit energy at frequency f1 will be performed by the routing device allowing the receiver to be simultaneously receiving signals at a different frequency f2. The only limitation to the frequency spacing between f1 and f2 is the operational bandwidth of the circulators, couplers and dividing components used in the routing device.

It will also be appreciated in view of this disclosure that practical limitations in the performance of the divider/combiner 57 may introduce undesired leakage signals that may reduce the transmit to receive isolation of the signal routing device 50. For example, a transmission leakage signal may exist in the divider/combiner 57 between ports 64 and 65. A portion of the first divided transmission output signal entering port 64 of the divider/combiner 57 may undesirably leak to port 65 and appear at the output port 53 of the routing device 50. This leakage is created by but not limited to the isolation of the divider/combiner 57 and reflection introduced at the connection between port 66 of the divider/combiner 57 and connecting line 74. In the similar way, a portion of the second divided transmission output signal entering port 65 of the divider/combiner 57 may undesirably leak to port 64 and appear at the output port 53 of the routing device 50. These leakage signals combine into a divider/combiner leakage signal, Ls, appearing at output port 53 of the routing device 50 and may interfere with the proper operation of the receiver. The divider/combiner leakage signal, Ls, is a complex value having an amplitude and relative phase.

It can be shown that when divider/combiner 57 has finite isolation between port 64 and port 65 then the transmit-to-receive isolation of routing device 50 will degrade. In practice, when divider/combiner 57 is a quadrature hybrid, coupled line coupler, branchline coupler, Lange coupler, rat race, ring hybrid or equal phase power combiner such as Wilkinson tee, resistive divider and T-junction or reactive tee, the port-to-port isolation will be in the range of 15-30 dB. The finite isolation creates a transmitter leakage signal that is not cancelled by the routing device 50. In this case, the divider/combiner leakage signal, Ls, appearing at output port 53 of the routing device 50 is limited by the value of the finite isolation of the divider/combiner 57.

Figure 13:
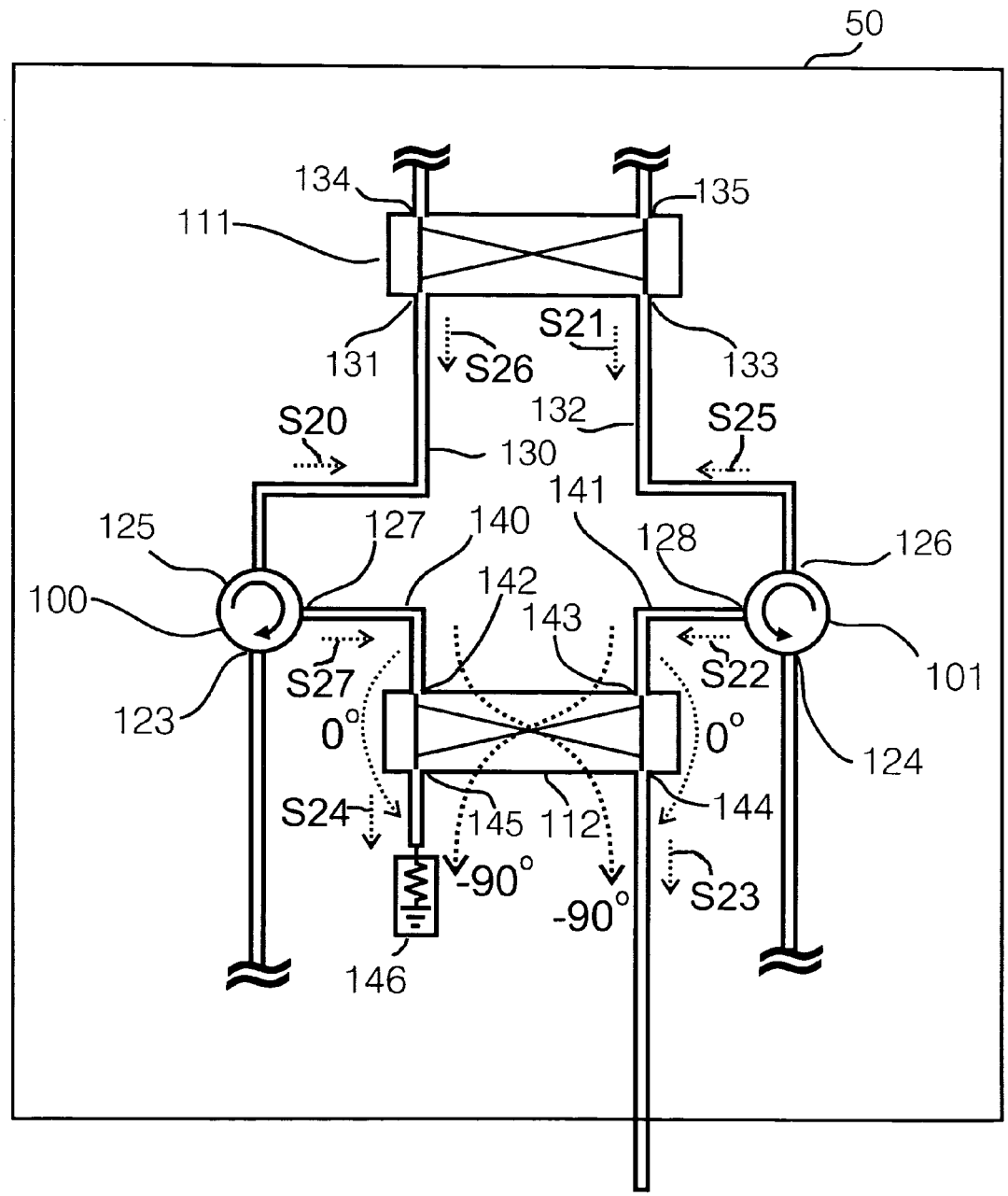
FIG. 13 is a diagram of an embodiment showing signal paths proceeding from a leakage source to the receive channel.

FIG. 13 shows the signal paths for the leakage signals from port 131 to port 133 and from port 133 to port 131. The upper and lower sections of the routing device 50 are not shown for clarity. For the transmitted signal entering the signal routing device 50 and divided into the first and second divided transmission signals and routed by the first and second routing devices 100 and 101 to the first and second divided transmission output signals represented in FIG. 13 as S20 and S25 respectively and having substantially equal amplitudes and a relative phase shift therebetween. The first and second routing devices 100 and 101 are shown as circulators but can be any other routing device such as directional couplers or other routing device. For this analysis, the first and second divided transmission output signals S20 and S25 will be assumed to have a voltage amplitude of 1/sqrt(2) and relative phase difference equal to 90 degrees as listed in TABLE 3. For this analysis, it is assumed that the first and second routing devices 100 and 101 are ideal and signals entering port 123 and 124 are routed to ports 125 and 126 respectively with no change in amplitude and phase shift equal to $-\phi 1$. Also, signals entering ports 125 and 126 are routed to ports 127 and 128 with no change in amplitude and phase shift equal to $-\phi 1$. For this analysis, it is further assumed that the connecting lines 130 and 132 will introduce a phase shift of $-\phi 4$ degrees and that the connecting lines 140 and 141 will introduce a phase shift of $-\phi 5$ degrees. In practice, these connecting lines will have an associated insertion loss but the insertion loss will not be included as part of this analysis. A portion of second divided transmission output signal S25 entering port 133 of common hybrid 111 will leak to port 131 as a third transmission leakage signal S26. A portion of the first divided transmission output signal S20 entering port 131 of common hybrid 111 will leak to port 133 as a fourth transmission leakage signal S21. These undesired leakage signals are found in practice and not limited to quadrature hybrids. This leakage would also be present in coupled line coupler, branchline coupler, Lange coupler, rat race, ring hybrid or equal phase power combiner such as Wilkinson tee, resistive divider and T-junction or reactive tee. The leakage signal can be measured and/or calculated using standard techniques known in the industry.

For this analysis, the third and fourth transmission leakage signals S26 and S21 will experience a change in amplitude equal to H and a phase shift equal to $-\phi H$. The third and fourth transmission leakage signals S26 and S21 will travel along feed lines 130 and 132 respectively and be routed through the signal routing devices 100 and 101 respectively and exit through port 127 and 128 respectively. In practice, these transmission paths will include insertion loss and the amplitude and phase will be a function of frequency. These modified third and fourth transmission leakage signals entering port 142 and port 143 are represented as S27 and S22 respectively in FIG. 13 and TABLE 3. The signal S22 will have an amplitude equal to H/sqrt(2) and relative phase of $(-90-2(\phi 1)-2(\phi 4)-\phi 5-\phi H)$ degrees. The signal S27 will have amplitude equal to H/sqrt(2) and relative phase of $(-2(\phi 1)-2(\phi 4)-\phi 5-\phi H)$ degrees. The power in each input signal to the output quadrature hybrid 112 is divided in half or the voltage amplitude is scaled by a factor of 1/sqrt(2) in voltage. A relative phase shift of $-90$ degrees is introduced into the signal passing from the port 143 over to the port 145. A relative phase shift of −90 degrees is introduced into the signal passing from the port 142 over to the port 144. A relative phase shift of 0 degrees is introduced into the signal passing from the port 142 over to the port 145. A relative phase shift of 0 degrees is introduced into the signal passing from the port 143 over to the port 144.

Vector addition of these leakage signals at port 145 of the quadrature hybrid 112 will show signal cancellation resulting in output amplitude S24 equal to 0. Vector addition of these leakage signals at port 144 of the quadrature hybrid 112 will show signal addition resulting in output amplitude S23 equal to H and relative phase shift of $(-90-2(\phi 1)-2(\phi 4)-\phi 5-H)$. Output port 144 is connected to the receiver and the total leakage signal S23 is undesired and may affect the proper operation of the receiver. The total leakage signal S23 described here was previously referred to as divider/combiner leakage signal, Ls. Therefore, the divider/combiner leakage signal, Ls, will have a relative amplitude of H and a relative phase shift of $(-90-2(\phi 1)-2(\phi 4)-\phi 5-\phi H)$.

$$Ls = |Ls| \angle \phi_{Ls} = H \angle (-90 - 2(\phi 1) - 2(\phi 4) - \phi 5 - \phi H)$$

It is therefore necessary to eliminate or reduce the amplitude of the divider/combiner leakage signal, Ls, to an acceptable level for proper operation of the receiver.

TABLE 3

| Signal | Amplitude | Phase |
| --- | --- | --- |
| S20 | 1/sqrt(2) | $-90 - \phi 1 - \phi 4$ |
| S25 | 1/sqrt(2) | $-\phi 1 - \phi 4$ |
| S21 | H/sqrt(2) | $-90 - \phi 1 - \phi 4 - \phi H$ |
| S26 | H/sqrt(2) | $-\phi 1 - \phi 4 - \phi H$ |
| S22 | H/sqrt(2) | $-90 - 2(\phi 1) - 2(\phi 4) - \phi 5 - \phi H$ |
| S27 | H/sqrt(2) | $-2(\phi 1) - 2(\phi 4) - \phi 5 - \phi H$ |
| S24 | 0 | |
| S23 | H | $-90 - 2(\phi 1) - 2(\phi 4) - \phi 5 - \phi H$ |

It was previously discussed that tuning elements and/or phase adjustment may be inserted along any connecting line in order to balance the amplitude and phase of the signals traveling within the signal routing device 50. Unfortunately, tuning elements that "balance" or match signal paths will not reduce the amplitude of the divider/combiner leakage signal, Ls. In contrast to using tuning elements to balance the amplitude and phase characteristics, the present invention optionally provides for the use of reflector devices introduced to the routing device 50 and configured to "imbalance" a portion of the signal paths in order to introduce a compensating signal, Cs, that is substantially equal in amplitude to the divider/combiner leakage signal, Ls, but having approximately 180-degree relative phase difference for the purpose of reducing the amplitude of the divider/combiner leakage signal, Ls, appearing at output port 53 of the routing device 50. In practice exact matching of Cs and Ls so as to be equal in amplitude and have exactly 180 degree phase difference is impracticable, hence the present invention is directed to an embodiment where this matching is substantially or approximately achieved such that the divider/combiner leakage signal, Ls, is reduced to a level permitting desired system operation such as or better than that illustrated in FIG. 8 isolation characteristic 151. Such reflector devices may include stubs or lumped components or other devices as are known by those skilled in the art.

The present invention further includes embodiments which include a reflector device to create an imbalance in the routing device 50 resulting in a compensation signal, Cs, that will effectively reduce the divider/combiner leakage signal, Ls, created from the finite isolation of the common quadrature hybrid 111.

As described above and shown in TABLE 3, one of the limitations for achieving high transmit to receive isolation using the signal routing device 50 is the direct result of divider/combiner leakage signal, Ls. In order to reduce the effect of this leakage signal and improve the overall isolation of the signal routing device 50, a separate compensating signal, Cs, can be added at the receiver port 53. This additional compensating signal needs to have approximately the same amplitude as the divider/combiner leakage signal, Ls, and approximately 180-degree relative phase shift to the phase of the leakage signal.

Figure 14:
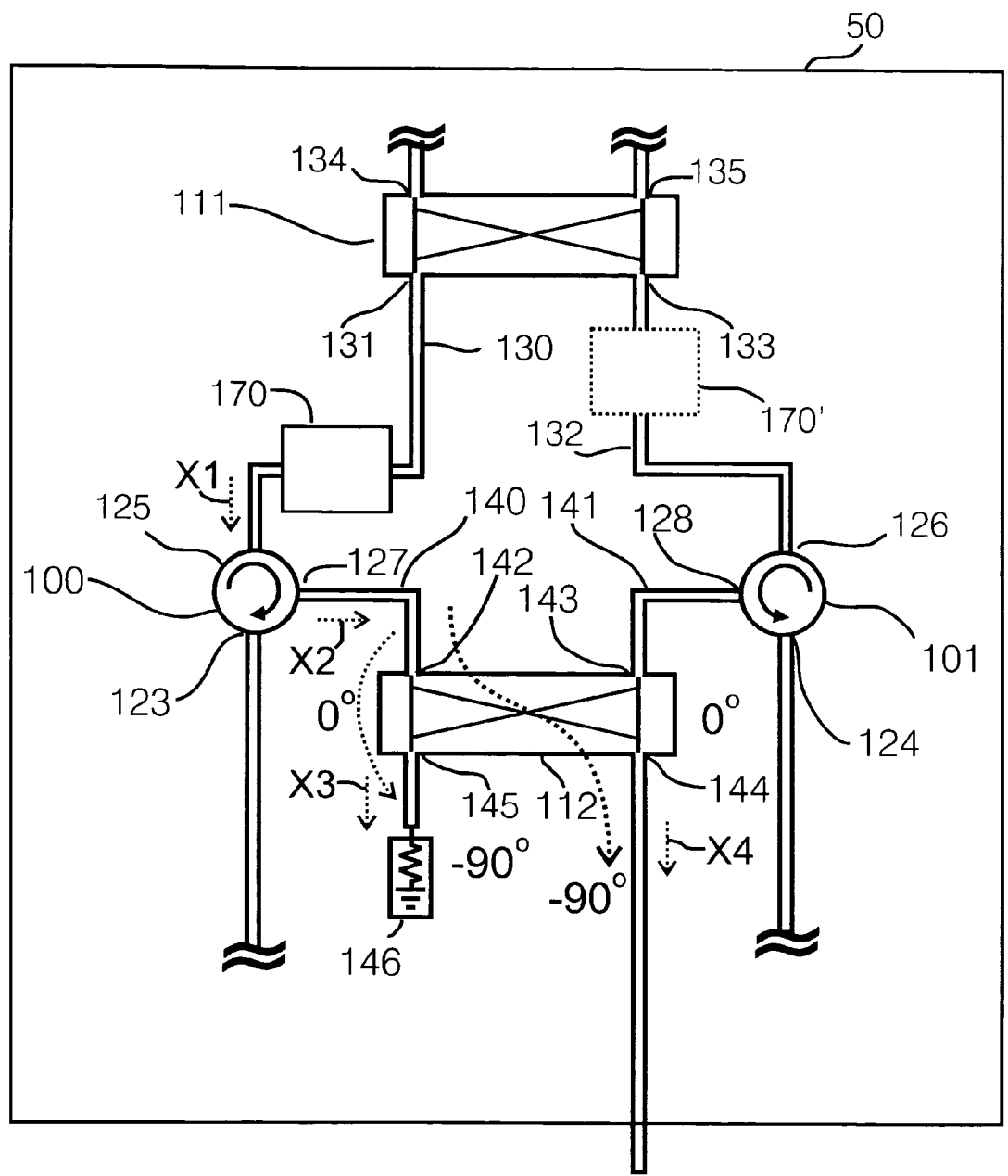
FIG. 14 is a diagram of an embodiment showing the signal paths from a reflective device to the receive channel.

The present invention provides for a reflector device 170 or 170' respectively placed along connecting line 130 or 132 which will introduce an imbalance in routing device 50 and an associated compensating signal, Cs, that appears at the receiver port thus effecting an improvement in transmit to receive isolation when the compensating signal, Cs, is properly set to cancel the divider/combiner leakage signal, Ls. The present invention further provides a configuration wherein both reflector devices 170 and 170' are used. In configurations when both reflector devices 170 and 170' are simultaneously used, the combination can be set so they effect an imbalance in routing device 50 and the combined compensation signal, Cs, can also be used to effect a cancellation of the divider/combiner leakage signal, Ls. FIG. 14 shows the signal paths for the signal S30 reflected from reflector device 170 placed along connecting line 130. The upper and lower sections of the routing device 50 are not shown for clarity. The reflected signal S30 is a portion of the first divided transmission output signal leaving port 125 of the routing device 100. For this analysis, the reflected signal S30 entering port 125 of the first routing device 100 is assumed to have an amplitude X/sqrt(2) and relative phase $(-\phi X - 90 - 2(\phi 6) - \phi 1)$ degrees, as shown in TABLE 4, where the amplitude of the reflection from reflector device 170 is X and the relative phase of the reflection from reflector device 170 is $-\phi X$. It is also assumed that signals entering port 125 of signal routing device 100 is routed to port 127 with no change in amplitude and phase shift equal to $-\phi 1$ degrees. The portion of connecting line 130 between reflector device 170 and port 125 of routing device 100 will introduce a relative phase shift of $-\phi 6$ degrees. The length of connecting line 140 will introduce an additional phase shift of $-\phi 5$ degrees. The signal S31 entering port 142 of output quadrature hybrid 112 will have an amplitude of X/sqrt(2) and relative phase of $(-\phi X - 90 - 2(\phi 6) - 2(\phi 1) - \phi 5)$ degrees. The output quadrature hybrid 112 divides the input power to any port in half or the voltage is scaled by a factor of 1/sqrt(2). A relative phase shift of 0 degrees is introduced into the signal passing from the port 142 over to the port 145. A relative phase shift of −90 degrees is introduced into the signal passing from the port 142 over to the port 144. The resulting signal S32 leaving port 145 of output quadrature hybrid 112 will have an amplitude of X/2 and relative phase of $(-\phi X - 90 - 2(\phi 6) - 2(\phi 1) - \phi 5)$ degrees. The resulting signal S33 leaving port 144 of output quadrature hybrid 112 will have an amplitude of X/2 and relative phase of $(-\phi X - 180 - 2(\phi 6) - 2(\phi 1) - \phi 5)$ degrees. Reflected signal S33 was previously referred to as compensating signal, Cs.

$$Cs = |Cs| \angle \phi_{Cs} = (X/2) \angle (-\phi X - 180 - 2(\phi 6) - 2(\phi 1) - \phi 5)$$

The reflector device 170 and placement along connecting line 130 is set to provide a compensating signal, Cs, that is substantially equal in the amplitude to the divider/combiner leakage signal, Ls, and relative phase of approximately 180- degrees out of phase with the divider/combiner leakage signal, Ls. The vector addition of these signals will reduce or eliminate the divider/combiner leakage signal, Ls, thus improving the transmitter to receiver channel isolation.

$|Cs|\angle\phi_{Cs} \approx |Ls|\angle(\phi_{Ls}-180)$ for the amplitudes $|Cs| \approx |Ls|$ $(X/2) \approx H$ then $X \approx (2H)$ for the phases $\angle\phi_{Cs} \approx \angle(\phi_{Ls}-180)$ $(-\#X-2(\phi6)-2(\phi1)-\phi5-180) \approx ((-90-2(\phi1)-2(\phi4)-\phi5-\phi H)-180)$ $(-\phi X-2(\phi6)) \approx (-90-2(\phi4)-\phi H)$ then $-\phi X \approx (-90-2(\phi4)-\phi H+2(\phi6))$ As a result, the amplitude, X, of the reflected signal from reflector device 170 should be set to be substantially equal to twice the amplitude, H, of the leakage signal of common quadrature hybrid 111. The relative phase, $-\phi X$, of the reflected signal from reflector device 170 should be set to be approximately equal to the $(-90-2(\phi4)-\phi H+2(\phi6))$ degrees where $-\phi H$ is the phase shift of the leakage signal of common quadrature hybrid 111.

TABLE 4

| Signal | Amplitude | Phase |
|---|---|---|
| S30 | X/sqrt(2) | $-\phi X - 90 - 2(\phi6) - \phi1$ |
| S31 | X/sqrt(2) | $-\phi X - 90 - 2(\phi6) - 2(\phi1) - \phi5$ |
| S32 | X/2 | $-\phi X - 90 - 2(\phi6) - 2(\phi1) - \phi5$ |
| S33 | X/2 | $-\phi X - 180 - 2(\phi6) - 2(\phi1) - \phi5$ |

Reflector device 170 should be set to effect cancellation of the divider/combiner leakage signal, Ls, such that a transmit to receive isolation of at least 30 dB is achieved over a frequency range associated with the system use. More preferably, reflector device 170 should be set to effect leakage cancellation such that at least 35 dB isolation is achieved over the desired frequency range. Still more preferably, reflector device 170 should be set to effect leakage cancellation such that at least 40 dB isolation is achieved over the desired frequency range.

Figure 16C:
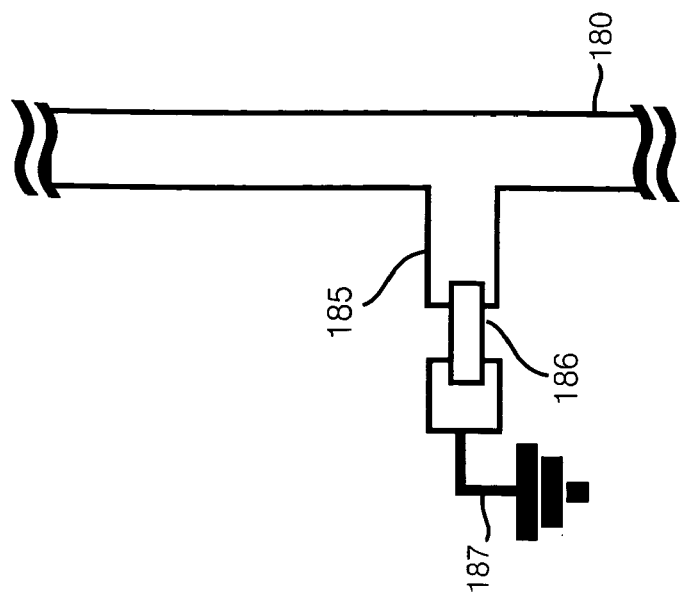
FIG. 16C is an embodiment showing the reflective device configured as a reactive lumped element.
Figure 16B:
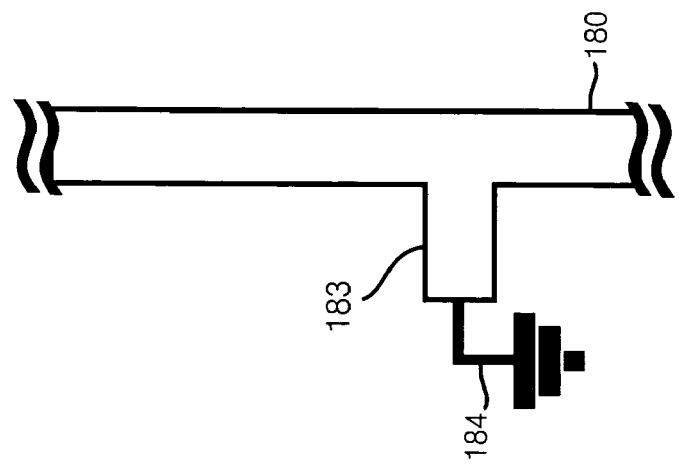
FIG. 16B is a diagram of an embodiment showing the reflective device configured as a shorted stub.
Figure 16A:
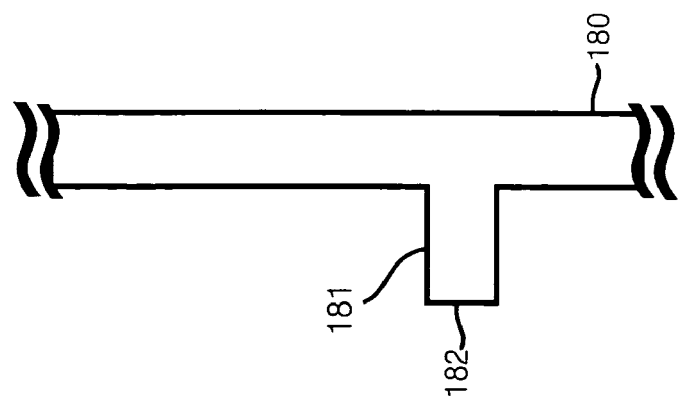
FIG. 16A is a diagram of an embodiment showing the reflective device configured as an open stub.

In the preferred embodiment of this invention, reflector device 170 and/or 170' is an open stub transmission line. FIG. 16A shows a top view of the preferred embodiment using transmission line 180 that is a portion of one of the connecting lines previously described. Open circuit 182 is at the end of transmission line stub 181. The length and width of transmission line stub 181 is set to effect cancellation of the divider/combiner leakage signal, Ls. Alternatively, the reflector device 170 and/or 170' can be a shorted stub transmission line. FIG. 16B shows a top view of an embodiment using transmission line 180 with a short circuit 184 placed along transmission line stub 183. The length and width of transmission line stub 183 is set to effect cancellation of the divider/combiner leakage signal, Ls. Alternatively, the reflector device 170 and/or 170' can a lumped element type reactive component such as a capacitor or inductor. FIG. 16C shows a top view of an embodiment using transmission line 180 with a short circuit 187 placed at the end of reactive component 186. It will be understood that FIGS. 16A-16C are not to scale and that they are schematic in nature and that actual implementation is dependent upon the materials and frequencies involved. Reactive component 186 is connected to transmission line stub 185. The capacitance or inductance value of reactive component 186 and the length and width of transmission line stub 185 are set to effect cancellation of the divider/combiner leakage signal, Ls.

A similar mathematical derivation to that described above can show that a compensating signal reflected from a reflector device 170' place along connecting line 132 will effect cancellation of the divider/combiner leakage signal, Ls. For this analysis, the reflected signal entering port 126 of the second routing device 101 is assumed to have an amplitude Y/sqrt(2) and relative phase $(-\phi Y-2(\phi7)-\phi1)$ degrees where the amplitude of the reflection from reflector device 170' is Y and the relative phase of the reflection from reflector device 170 is $-\phi Y$. It is also assumed that signals entering port 126 of signal routing device 101 is routed to port 128 with no change in amplitude and phase shift equal to $-\phi1$ degrees. The portion of connecting line 132 between reflector device 170' and port 126 of routing device 101 will introduce a relative phase shift of $-\phi7$ degrees. The length of connecting line 141 will introduce an additional phase shift of $-\phi5$ degrees. The signal entering port 143 of output quadrature hybrid 112 will have an amplitude of Y/sqrt(2) and relative phase of $(-\phi Y-2(\phi7)-2(\phi1)-\phi5)$ degrees. The output quadrature hybrid 112 divides the input power to any port in half or the voltage is scaled by a factor of 1/sqrt(2). A relative phase shift of 0 degrees is introduced into the signal passing from the port 143 over to the port 144. A relative phase shift of −90 degrees is introduced into the signal passing from the port 143 over to the port 145. The resulting signal leaving port 145 of output quadrature hybrid 112 will have an amplitude of Y/2 and relative phase of $(-\phi Y-2(\phi7)-2(\phi1)-\phi5-90)$ degrees. The resulting signal leaving port 144 of output quadrature hybrid 112 will have an amplitude of Y/2 and relative phase of $(-\phi Y-2(\phi7)-2(\phi1)-\phi5)$ degrees. This reflected signal was previously referred to as compensating signal, Cs.

As a result, the amplitude, Y, of the reflected signal from reflector device 170' should be set to be substantially equal to twice the amplitude, H, of the leakage signal of common quadrature hybrid 111. The relative phase, $-\phi Y$, of the reflected signal from reflector device 170' should be set to be approximately equal to the $(-270-\phi H-2(\phi4)+2(\phi7))$ degrees where $-\phi H$ is the phase shift of the leakage signal of common quadrature hybrid 111.

It is important to note that it may be possible to effect cancellation of the divider/combiner leakage signal, Ls, with the introduction of two or more reflector devices placed along connecting line 130 and/or connecting line 132 and therefore effecting an imbalance in the routing device 50 for effecting cancellation of the divider/combiner leakage signal, Ls.

Figure 15:
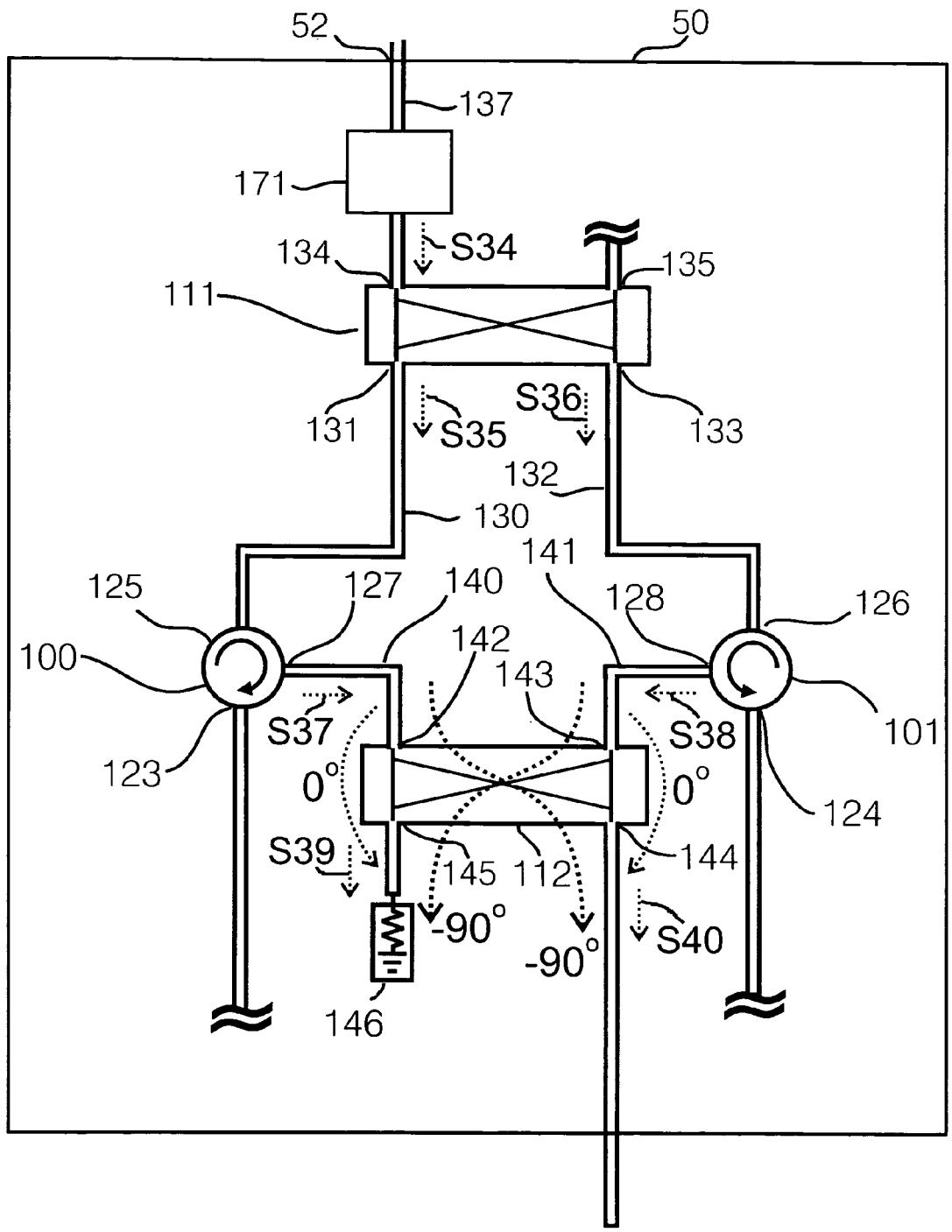
FIG. 15 is a diagram of an embodiment showing the signal paths from a reflective device to the receive channel.

Another technique for reducing the amplitude of divider/combiner leakage signal, Ls, is provided by reflector device 171 placed along connecting line 137 between common port 134 of the common quadrature hybrid 111 and the common port 52 of the signal routing device 50 as shown in FIG. 15. Portions of the upper and the lower sections of routing device 50 in FIG. 15 are not shown for clarity. Reflector device 171 reflects a portion of the transmission output signal back into common port 134 of common quadrature hybrid 111. A substantial portion of this reflected signal will appear at port 144 of output quadrature hybrid 112 and may be used to reduce the amplitude of divider/combiner leakage signal, Ls. Reflector device 171 is set to effect an amplitude for the compensating signal, Cs', appearing at port 144, to be substantially equal in amplitude to the divider/combiner leakage signal, Ls, appearing at port 144, and approximately 180-degrees in relative phase to the divider/combiner leakage signal, Ls, appearing at port 144. For this configuration, the compensating signal will be referred with variable Cs'. The vector addition of divider/combiner leakage signal, Ls, and the compensating signal, Cs', created from signal reflection from the reflector device 171 will result in signal cancellation at port 144 and improve the transmitter to receiver channel isolation. FIG. 15 shows the signal path from the reflector device 171 to port 144 of the output quadrature hybrid 112. TABLE 5 shows the amplitude and relative phase for the associated signals. For this analysis, it is assumed that signals entering port 125 and 126 of signal routing device 100 and 101 are routed to ports 127 and 128 respectively with no change in amplitude and phase shift equal to $-\phi1$. The portion of connecting line 137 between reflector device 171 and common port 134 of common quadrature hybrid 111 will introduce a relative phase shift of $-\phi8$ degrees. The signal S34 is the reflected signal from the reflector device 171 and enters common port 134 of common quadrature hybrid 111. For this analysis, the reflected signal S34 is assumed to have an amplitude R and relative phase $(-\phi R-\phi1-\phi4-2(\phi8)-90)$ where the amplitude of the reflection from reflector device 171 is R and the relative phase of the reflection from reflector device 171 is $-\phi R$. The signal S34 enters common quadrature hybrid 111 at port 134 and divided between port 131 and port 133. The signal S35 leaving port 131 will have an amplitude equal to R/sqrt(2) and relative phase of $(-\phi R-\phi1-\phi4-2(\phi8)-90)$ degrees. The signal S36 leaving port 133 will have an amplitude equal to R/sqrt(2) and relative phase of $(-\phi R-\phi1-\phi4-2(\phi8)-180)$ degrees. The connecting lines 130 and 132 will introduce an additional phase shift of $-\phi4$ degrees to each respective signal. The signal routing device 100 and 101 will introduce a relative phase shift of $-\phi1$ degrees. The connecting lines 140 and 141 will introduce a phase shift of $-\phi5$ degrees to each respective signal. The signal S37 entering port 142 of output quadrature hybrid 112 will have a magnitude of R/sqrt(2) and relative phase of $(-\phi R-2(\phi1)-2(\phi4)-2(\phi8)-90-\phi5)$ degrees. The signal S38 entering port 143 of output quadrature hybrid 112 will have an amplitude of R/sqrt(2) and relative phase of $(-\phi R-2(\phi1)-2(\phi4)-2(\phi8)-180-\phi5)$ degrees. The power in each input signal to the output quadrature hybrid 112 is divided in half or the voltage is scaled by a factor of 1/sqrt(2). A relative phase shift of $-90$ degrees is introduced into the signal passing from the port 143 over to the port 145. A relative phase shift of $-90$ degrees is introduced into the signal passing from the port 142 over to the port 144. A relative phase shift of 0 degrees is introduced into the signal passing from the port 142 over to the port 145. A relative phase shift of 0 degrees is introduced into the signal passing from the port 143 over to the port 144.

Vector addition of the reflected signals at port 145 of the output quadrature hybrid 112 will show signal cancellation resulting in a signal amplitude of signal S39 equal to 0. Vector addition of the reflected signals at port 144 of the output quadrature hybrid 112 will show signal addition resulting in output amplitude of signal S40 equal to R and relative phase $(-\phi R-2(\phi1)-2(\phi4)-2(\phi8)-180-\phi5)$ degrees. Reflected signal S40 is referred to as the compensating signal, Cs'.

$$Cs'=|Cs'|\angle\phi_{Cs'}=R\angle(-\phi R-2(\phi1)-2(\phi4)-2(\phi8)-180-\phi5)$$

The reflector device 171 and placement along connecting line 137 is set to provide a compensating signal, Cs', that is substantially equal in the amplitude to the divider/combiner leakage signal, Ls, and relative phase of approximately 180-degrees with the divider/combiner leakage signal, Ls. The vector addition of these signals will reduce or eliminate the amplitude of the divider/combiner leakage signal, Ls, thus improving the transmitter to receiver channel isolation.

$$|Cs'|\angle\phi_{Cs'}\approx|Ls|\angle(\phi_{Ls}-180)$$

for the amplitudes $$|Cs'|\approx|Ls|$$

then $$R\approx H$$

for the phase, $$\angle\phi_{Cs'}\approx\angle(\phi_{Ls}-180)$$

$$(-\phi R-2(\phi1)-2(\phi4)-2(\phi8)-180-\phi5)\approx((-90-2(\phi1)-2(\phi4)-\phi5-\phi H)-180)$$

then $$-\phi R\approx-\phi H-90+2(\phi8)$$

As a result, the amplitude, R, of the reflected signal from reflector device 171 should be set to be substantially equal the amplitude, H, of the leakage signal of common quadrature hybrid 111. The relative phase, $-\phi R$, of the reflected signal from reflector device 171 should be set to be approximately equal to the $(-\phi H-90+2(\phi8))$ degrees where $-\phi H$ is the phase shift of the leakage signal of common quadrature hybrid 111. The relative phase is a modulo function of 360-degrees so that the relative phase, $-\phi R$, of the reflected signal from reflector device 171 can also be set to be approximately equal to the $(-\phi H-90+2(\phi8)-n(360))$ degrees, where n= . . . , $-2$, $-1$, 0, 1, 2, 3, 4, . . . . Reflector device 171 should be set to effect cancellation of the divider/combiner leakage signal, Ls, such that a transmit to receive isolation of at least 30 dB is achieved over a frequency range associated with the system use. More preferably, reflector device 171 should be set to effect leakage cancellation such that at least 35 dB isolation is achieved over the desired frequency range. Still more preferably, reflector device 171 should be set to effect leakage cancellation such that at least 40 dB isolation is achieved over the desired frequency range.

In the preferred embodiment of this invention, reflector device 171 is an open stub transmission line. FIG. 16A shows a top view of the preferred embodiment using transmission line 180 that is a portion of one of the connecting lines previously described. Open circuit 182 is at the end of transmission line stub 181. The length and width of transmission line stub 181 is set to effect cancellation of the divider/combiner leakage signal, Ls. Alternatively, the reflector device 171 can be a shorted stub transmission line. FIG. 16B shows a top view of an embodiment using transmission line 180 with a short circuit 184 placed along transmission line stub 183. The length and width of transmission line stub 183 is set to effect cancellation of the divider/combiner leakage signal, Ls. Alternatively, the reflector device 171 can a lumped element type reactive component such as a capacitor or inductor. FIG. 16C shows a top view of an embodiment using transmission line 180 with a short circuit 187 placed at the end of reactive component 186. Reactive component 186 is connected to transmission line stub 185. The capacitance or inductance value of reactive component 186 and the length and width of transmission line stub 185 are set to effect cancellation of the divider/combiner leakage signal, Ls.

TABLE 5

| Signal | Amplitude | Phase |
|---|---|---|
| S34 | R | $-\phi R - \phi 1 - \phi 4 - 2(\phi 8) - 90$ |
| S35 | R/sqrt(2) | $-\phi R - \phi 1 - \phi 4 - 2(\phi 8) - 90$ |
| S36 | R/sqrt(2) | $-\phi R - \phi 1 - \phi 4 - 2(\phi 8) - 180$ |
| S37 | R/sqrt(2) | $-\phi R - 2(\phi 1) - 2(\phi 4) - 2(\phi 8) - 90 - \phi 5$ |
| S38 | R/sqrt(2) | $-\phi R - 2(\phi 1) - 2(\phi 4) - 2(\phi 8) - 180 - \phi 5$ |
| S39 | 0 | |
| S40 | R | $-\phi R - 2(\phi 1) - 2(\phi 4) - 2(\phi 8) - 180 - \phi 5$ |

It will be appreciated that a reflector device introduced to create a compensating signal, Cs or Cs', to effect cancellation of the amplitude of the divider/combiner leakage signal, Ls, can also be implemented in routing device 50 when directional couplers 155 and 156 are used in place of circulators 100 and 101. As shown in FIG. 10, leakage from common quadrature hybrid 111 is still present in this configuration and any divider/combiner leakage signal found on connecting line 147 can be cancelled through the use of a reflector device placed on connecting line 137 and/or connecting line 130 and/or connecting line 132.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. Such modifications include substitution of components for components specifically identified herein, wherein the substitute component provide functional results which permit the overall functional operation of the present invention to be maintained. Such substitutions are intended to encompass presently known components and components yet to be developed which are accepted as replacements for components identified herein and which produce result compatible with operation of the present invention. Furthermore, while examples have been provided illustrating operation at certain power levels and frequencies, the present invention as defined in this disclosure and claims appended hereto is not considered limited to frequencies and power levels recited herein. It is furthermore to be understood that the receiver and transmitter referenced herein is not considered limited to any particular types of receivers or transmitters nor any particular form of signals in that the signals may carry analog or digital information, in any modulation scheme, or the signals need not carry information. Furthermore, the signals used in this invention are considered to encompass any electromagnetic wave transmission.

What is claimed is:

1. An electromagnetic signal routing assembly for effecting two way duplex transmissions, comprising:
   a transmission signal input for receiving first transmission signal;
   a common port for outputting a portion of said first transmission signal from said transmission signal input and simultaneously receiving a second transmission signal;
   a transmission signal output for outputting a portion of said second transmission signal;
   a signal divider receiving said first transmission signal from said transmission signal input and dividing said first transmission signal into first and second divided transmission signals having amplitudes within a first amplitude range of each other and a first relative phase shift therebetween;
   first and second routing devices each having at least first, second and third ports, said first and second routing devices being configured to simultaneously deliver a signal at said first port to said second port and another signal at said second port to said third port, wherein:
   s21 is a transmission coefficient from said first port to said second port;
   s32 is a transmission coefficient from said second port to said third;
   s31 is a transmission coefficient from said first port to said third port;
   said s21 is greater than said s31; and
   said s32 is greater than said s31;
   said first routing device having said first divided transmission signal applied to said first port of said first routing device and simultaneously producing:
   a first divided transmission output signal at said second port of said first routing device; and
   a first transmission leakage signal at said third port of said first routing device,
   each resultant from said first divided transmission signal;
   said first routing device also having a third divided transmission signal, when present, applied to said second port of said first routing device and producing, simultaneously with said first divided transmission output signal and said first transmission leakage signal, a third divided transmission output signal at said third port of said first routing device resultant from said third divided transmission signal;
   said second routing device having said second divided transmission signal applied to said first port of said second routing device and simultaneously producing:
   a second divided transmission output signal at said second port of said second routing device; and
   a second transmission leakage signal at said third port of said second routing device,
   each resultant from said second divided transmission signal;
   said second routing device also having a fourth divided transmission signal, when present, applied to said second port of said second routing device and producing, simultaneously with said second divided transmission output signal and said second transmission leakage signal, a fourth divided transmission output signal at said third pert of said second routing device resultant from said fourth divided transmission signal:
   a signal divider/combiner having:
   first and second divider/combiner ports for receiving said first and second divided transmission output signals and a configuration for combining these signals at levels within a second relative amplitude range and with a second relative phase shift therebetween to output said portion of said first transmission signal to said common port; and
   said configuration being such that said second transmission signal, when present and received at said common port, said second transmission signal is divided into said third and fourth divided transmission signals having amplitudes within said second relative amplitude range and with said second relative phase shift therebetween;
   a signal combiner having first and second combiner inputs for receiving said first and second transmission leakage signals and, when present, for receiving said third and fourth divided transmission output signals, said signal combiner including said transmission signal output, and said signal combiner being configured to introduce a third relative phase shift into signals applied to at least one of said first and second combiner inputs and combine signals applied to said first and second combiner inputs at said transmission signal output at levels within a third amplitude range such that:
said first and second transmission leakage signals arrive at said transmission signal output at levels within an amplitude tolerance range and a total relative phase shift therebetween within a phase tolerance range situated about 180 degrees to effect a destructive combination resulting in at least partial cancellation of said first and second transmission leakage signals at said transmission signal output; and
said third and fourth divided transmission output signals, when present, arrive at said transmission signal output to effect a constructive combination of said third and fourth divided transmission output signals to output a portion of said second transmission signal at said transmission signal output; said configuration of said signal divider/combiner producing:
a third transmission leakage signal, at said first divider/combiner port which is a portion of said second divided transmission output signal; and
a fourth transmission leakage signal, at said second divider/combiner port, which is a portion of said first divided transmission output signal;
said first routing device receiving said third transmission leakage signal at said second port and producing at said third port a third transmission leakage output signal resultant from said third transmission leakage signal;
said second routing device receiving said fourth transmission leakage signal at said second port and producing at said third port a fourth transmission leakage output signal resultant from said forth transmission leakage signal;
a reflecting configuration configured to produce at least one reflected signal, said reflecting configuration being one of:
a first reflector configuration having a reflector device applied to said common port and configured to reflect into said common port a portion of said portion of said first transmission signal as a common port reflected signal, and said configuration of said signal divider/combiner being so arranged as to divide said common port reflected signal into first and second reflected divided signals having amplitude levels within said second amplitude range and said second relative phase shift therebetween, said first and second reflected divided signals being respectively output at said first and second divider/combiner ports as said at least one reflected signal;
a second reflector configuration having a reflector device applied between said second port of said first routing device and said first divider/combiner port of said signal divider/combiner and configured to reflect into said second port of said first routing device a reflected signal, which is a portion of said first divided transmission output signal, as said at least one reflected signal thereby creating an imbalance in levels of said first divided transmission output signal and said second divided transmission output signal arriving at said first and second divider/combiner ports;
a third reflector configuration having a reflector device applied between said second port of said second routing device and said second divider/combiner port of said signal divider/combiner and configured to reflect into said second port of said second routing device a reflected signal, which is a portion of said second divided transmission output signal, as said at least one reflected signal thereby creating an imbalance in levels of said first divided transmission output signal and said second divided transmission output signal arriving at said first and second divider/combiner ports; or
a fourth reflector configuration having:
a first reflector device applied between said second port of said first routing device and said first divider/combiner port of said signal divider/combiner and configured to have a first reflection coefficient to reflect into said second port of said first routing device a portion of said first divided transmission output signal as a first reflected signal; and
a second reflector device applied between said second port of said second routing device and said second divider/combiner port of said signal divider/combiner and configured to have a second reflection coefficient to reflect into said second port of said second routing device a portion of said second divided transmission output signal as a second reflected signal, wherein said first and second reflection coefficients are such that a phase imbalance is generated between said first reflected signal and said second reflected signal, and said at least one reflected signal includes said first reflected signal and said second reflected signal; and
said signal combiner having said first and second combiner inputs respectively receiving said third and fourth transmission leakage output signals, and respectively receiving, via at least one of said first and second routing devices, at least one reflection signal output resultant from said at least one reflected signal, said signal combiner being so configured as to destructively combine said at least one reflection signal output at said transmission signal output with said third and fourth transmission leakage output signals to effect at least partial cancellation of said third and fourth transmission leakage output signals arriving at said transmission signal output.

2. The electromagnetic signal routing assembly or claim 1 wherein said first and second routing devices are circulators.

3. The electromagnetic signal routing assembly of claim 2 wherein said signal divider is a quadrature hybrid introducing said first relative phase shift and having an input port receiving said first transmission signal, an isolated port with a termination applied thereto, said first and second divided transmission signals are output at first and second divider outputs of said quadrature hybrid, said first relative phase shift is such that said first divided transmission signal lags said second divided transmission signal by said first relative phase shift.

4. The electromagnetic signal routing assembly of claim 3 wherein said signal divider/combiner is a quadrature hybrid introducing said second relative phase shift and having an isolated port with a termination applied thereto, two ports for receiving said first and second divided transmission output signals, said second relative phase shift introduced into said second divided transmission output signal is such that said second divided transmission output signal lags said first divided transmission output signal by said second relative phase shift such that:
said first and second divided transmission output signals are constructively combined at said common port to output said portion of the first transmission signal; and
said second transmission signal, when present, and simultaneously received at said common port is divided into said third and fourth divided transmission signals having said second relative phase shift, and said fourth divided transmission signal lags said third divided transmission signal by said second relative phase shift.

5. The electromagnetic signal routine assembly of claim 4 wherein said signal combiner is a quadrature hybrid having an isolated port with a termination applied thereto, two ports for receiving said first and second transmission leakage signals, said first transmission leakage signal lags said second transmission leakage signal by said third relative phase shift, and said first and second leakage transmission signals are combined at said isolated port and dissipated in said termination.

6. The electromagnetic signal routing assembly of claim 2 wherein said portion of said first transmission signal delivered to said common port is in a range of 0.3 dB to 2.5 dB lower than an amplitude level of said first transmission signal at said transmission signal input.

7. The electromagnetic signal routing assembly of claim 6 wherein said portion of said second transmission signal delivered to said transmission signal output is in a range of 0.3 dB to 2.5 dB lower than an amplitude level of said second transmission signal delivered to said common port.

8. The electromagnetic signal routing assembly of claim 2 wherein said at least partial cancellation of said first and second transmission leakage signals at said transmission signal output results in a combined signal that is at least 27 dB attenuated relative to said first transmission signal.

9. The electromagnetic signal routing assembly of claim 2 wherein said at least partial cancellation of said first and second transmission leakage signals at said transmission signal output results in a combined signal that is at least 37 dB attenuated relative to said first transmission signal.

10. The electromagnetic signal routing assembly of claim 1 wherein said signal divider/combiner is a quadrature hybrid introducing said second relative phase shift and having an isolated port with a termination applied thereto, two ports for receiving said first and second divided transmission output signals, said second relative phase shift introduced into said second divided transmission output signal is such that said second divided transmission output signal lags said first divided transmission output signal by said second relative phase shift such that:
said first and second divided transmission output signals are constructively combined at said common port to output said portion of the first transmission signal; and
said second transmission signal, when present, and simultaneously received at said common port is divided into said third and fourth divided transmission signals having said second relative phase shift, and said fourth divided transmission signal lags said third divided transmission signal by said second relative phase shift.

11. The electromagnetic signal routing assembly of claim 1 wherein said signal combiner is a quadrature hybrid having an isolated port with a termination applied thereto, two ports for receiving said first and second transmission leakage signals, said first transmission leakage signal lags said second transmission leakage signal by said third relative phase shift, and said first and second leakage transmission signals are combined at said isolated port and dissipated in said termination.

12. The electromagnetic signal routing assembly of claim 1 wherein said signal divider is a power splitter device having an input port receiving said transmission signal, and two output branches delivering said first and second divided transmission signals, one of said two output branches includes a phase shifting element introducing said first relative phase shift.

13. The electromagnetic signal routing assembly of claim 1 wherein:
said signal divider/combiner is a power splitter/combiner device having two branches for respectively receiving said first and second divided transmission signals, said power splitter/combiner device is configured as a signal combiner and one of said two branches includes a phase shifting element introducing said second relative phase shift; and
said power splitter/combiner device simultaneously divides said second transmission signal, when present, from said common port into said third and fourth divided transmission signals.

14. The electromagnetic signal routing assembly of claim 1 wherein said signal combiner is a power combiner having two input branches and an output port, one of said two input branches includes a phase shifting element introducing said third relative phase shift, said power combiner being configured for simultaneously receiving:
said first and second transmission leakage signals to effect destructive combining thereof at the output port; and
said third and fourth divided transmission output signals, when present, to combine at the output port.

15. The electromagnetic signal routing assembly of claim 1 wherein said first and second divided transmission signals are amplified.

16. The electromagnetic signal routing assembly for effecting two way duplex transmissions according to claim 1, wherein:
said reflecting configuration is said first reflector configuration;
said first routing device receives said first reflected divided signal at said second port and produces, simultaneously at said third port a first reflected divided output signal and said third transmission leakage output signal respectively resultant from said first reflected divided signal and said third transmission leakage signal;
said second routing device receives said second reflected divided signal at said second port and produces, simultaneously at said third port a second reflected divided output signal and said fourth transmission leakage output signal respectively resultant from said second reflected divided signal and said fourth transmission leakages signal;
and
said signal combiner has said first and second combiner inputs respectively receiving said third and fourth transmission leakage output signals, and respectively receiving said first and second reflected divided output signals as said at least one reflection signal output, said signal combiner is so configured as to destructively combine said first and second reflected divided output signals at said transmission signal output with said third and fourth transmission leakage output signals to effect said at least partial cancellation of said third and fourth transmission leakage output signals arriving at said transmission signal output.

17. The electromagnetic signal routing assembly of claim 16 wherein:
said third transmission leakage signal has an amplitude equal to an amplitude of said second divided transmission output signal multiplied by H and a phase shift $-\phi H$ relative to said second divided transmission output signal;
said fourth transmission leakage signal has an amplitude equal to an amplitude of said first divided transmission output signal multiplied by H and a phase shift $-\phi H$ relative to said first divided transmission output signal; and
said configuration of said reflector device is set to have a reflection coefficient R and a relative phase $-\phi R$ so as to effect said destructive combination of said third and fourth transmission leakage output signals by having R set to within an amplitude range of H and −φR set to within a reflected phase range of (−φH−90−2(φ8)) such that said at least partial cancellation of said third and fourth transmission leakage output signals and said at least partial cancellation of said first and second transmission leakage signals produces a transmit to receive isolation of at least 30 dB, wherein:
φ8 is a net electrical length of a portion of the common connecting line between said reflecting device and said common port of said signal divider/combiner.

18. The electromagnetic signal routing assembly of claim 16 wherein said reflector device is an open stub.

19. The electromagnetic signal routing assembly of claim 16 wherein said reflector device is a shorted stub.

20. The electromagnetic signal routing assembly of claim 16 wherein said reflector device includes a reactive component selected from the group consisting of a capacitor and an inductor.

21. The electromagnetic signal routing assembly for effecting two way duplex transmissions according to claim 1, wherein:
said reflecting configuration is said second reflector configuration:
said first routing device receives said reflected signal and said third transmission leakage signal at said second port and produces, simultaneously at said third port a reflected output signal and said third transmission leakage output signal respectively resultant from said reflected signal and said third transmission leakage signal; and
said signal combiner has said first and second combiner inputs respectively receiving said third and fourth transmission leakage output signals, and said first combiner input receiving said reflected output signal as said at least one reflection signal output, said signal combiner is so configured as to destructively combine a portion of said reflected output signal at said transmission signal output with said third and fourth transmission leakage output signals to effect said at least partial cancellation of said third and fourth transmission leakage output signals at said transmission signal output.

22. The electromagnetic signal routing assembly of claim 21 wherein:
said third transmission leakage signal has an amplitude equal to an amplitude of said second divided transmission output signal multiplied by H and a phase shift −φH relative to said second divided transmission output signal; and
said fourth transmission leakage has an amplitude equal to an amplitude of said first divided transmission output signal multiplied by H and a phase shift −φH relative to said first divided transmission output signal;
said reflected signal has an amplitude equal to an amplitude of said first divided transmission output signal multiplied by X and relative phase shift −φX;
X is set to within a reflected amplitude range of 2H and −φX is set to within a reflected phase range of (−90−2(φ4)−φH−2(φ6)) such that said at least partial cancellation of said third and fourth transmission leakage output signals and said at least partial cancellation of said first and second transmission leakage signals produces a transmit to receive isolation of at least 30 dB, wherein:
φ4 is a net electrical length of a first connecting line connecting the second port of the first routing device to the first divider/combiner port;
φ4 is a not electrical length of a second connecting line connecting the second port of the second routing device to the second divider/combiner port; and
φ6 is a net electrical length of a portion of the first connecting line between said reflecting device and said second port of said first routing device.

23. The electromagnetic signal routing assembly of claim 21 wherein said reflector device is an open stub.

24. The electromagnetic signal routing assembly acclaim 21 wherein said reflector device is a shorted stub.

25. The electromagnetic signal routing assembly of claim 21 wherein said reflector device includes a reactive component selected from the group consisting of a capacitor and an inductor.

26. The electromagnetic signal routing assembly for effecting two way duplex transmissions according to claim 1, wherein:
said reflecting configuration is said third reflector configuration;
said second routing device receives said reflected signal and said fourth transmission leakage signal at said second port and produces simultaneously at said third port a reflected output signal and said fourth transmission leakage output signal respectively resultant from said reflected signal and said fourth transmission leakage signal; and
said signal combiner has said first and second combiner inputs respectively receiving said third and fourth transmission leakage output signals, and said second combiner input receiving said reflected output signal as said at least one reflection signal output, said signal combiner is so configured as to destructively, combine a portion of said reflected output signal at said transmission signal output with said third and fourth transmission leakage output signals to effect said at least partial cancellation of said third and fourth transmission leakage output signals at said transmission signal output.

27. The electromagnetic signal routing assembly of claim 26 wherein:
said third transmission leakage signal has art amplitude equal to an amplitude of said second divided transmission output signal multiplied by and a phase shift −φH relative to said second divided transmission output signal; and
said fourth transmission leakage signal has an amplitude equal to an amplitude of said first divided transmission output signal multiplied by H and a phase shift −φH relative to said first divided transmission output signal;
said reflected signal has an amplitude equal to an amplitude of said second divided transmission output signal multiplied by Y and a relative phase shift of −φY; and
Y is set to within a reflected amplitude range of 2H and −φY is set to within a reflected phase range of (−270−2(φ4)−φH+2(φ7)) such that sat at least partial cancellation of said third and fourth leakage signals and said at least partial cancellation of said first and second leakage signals produces a transmit to receive isolation of at least 30 dB, wherein:
φ4 is a net electrical length of a first connecting line connecting the second port of the first routing device to the first divider/combiner port;
φ4 is a net electrical length of a second connecting line connecting the second port of the second routing device to the second divider/combiner port; and φ7 is a net electrical length of a portion of the second connecting line between said reflecting device and said second port of said second routing device.

28. The electromagnetic signal routing assembly of claim 26 wherein said reflector device is an open stub.

29. The electromagnetic signal routing assembly of claim 26 wherein said reflector device is a shorted stub.

30. The electromagnetic signal routing assembly of claim 26 wherein said reflector device includes a reactive component selected from the group consisting of a capacitor and an inductor.

31. The electromagnetic signal routing assembly for effecting two way duplex transmissions according to claim 1, wherein:
said reflecting configuration is said fourth reflector configuration;
said first routing device receives said first reflected signal and said third transmission leakage signal at said second port and produces, simultaneously at said third port a first reflected output signal and said third transmission leakage output signal;
said second routing device receives said second reflected signal and said fourth transmission leakage signal at said second port and produces, simultaneously at said third port a second reflected output signal and said fourth transmission leakage output signal; and
said signal combiner has said first and second combiner inputs respectively receiving said third and fourth transmission leakage output signals, and said first and second combiner inputs respectively receiving said first and second reflected output signals as said at least one reflection signal output, said signal combiner being so configured as to destructively combine a portion of said first and second reflected output signals at said transmission signal output with said third and fourth transmission leakage output signals to effect said at least partial cancellation of said third and fourth transmission leakage output signals at said transmission signal output such that said at least partial cancellation of said third and fourth leakage signals and said at least partial cancellation of said first and second leakage signal produces a transmit to receive isolation of at least 30 dB.

32. The electromagnetic signal routing assembly of claim 31 wherein said first and second reflector devices are embodied as one of an open stub, a shorted stub, or a reactive component selected from the group consisting of a capacitor and an inductor.

33. The electromagnetic signal routing assembly of claim 1 wherein said first and second transmission leakage signals are respectively attenuated 10 dB or greater relative to said first and second divided transmission signals, wherein said first amplitude range, said first relative phase shift, said third amplitude range, and said third relative phase shift are such that said first and second transmission leakage signals arrive at said transmission signal output with said total relative phase shift equal to 180 degrees within said phase tolerance range, wherein said phase tolerance range is +/−20.5 degrees, and having amplitudes within said amplitude tolerance range, wherein said amplitude tolerance range is +3.8 dB to −1.6 dB, so that said destructive combination results in said first and second leakage signals destructively combining at said transmission signal output to have an combined amplitude attenuated by said at least partial cancellation which is at least 22 dB relative to said first transmission signal.

34. The electromagnetic signal routing assembly of claim 33 wherein said phase tolerance range is +/−10 degrees, said amplitude tolerance range is +1.2 dB to −0.8 dB, and said reflector configuration effects said at least partial cancellation of said third and fourth transmission leakage output signals such that a transmit to receive isolation between said transmission signal input and said transmission signal output is at least 30 dB.

35. The electromagnetic signal routing assembly of claim 34 wherein said phase tolerance range is +/−5 degrees, said amplitude tolerance range is +/−0.3 dB, and said reflector configuration effects said at least partial cancellation of said third and fourth transmission leakage output signals such that a transmit to receive isolation between said transmission signal input and said transmission signal output is at least 35 dB.

36. The electromagnetic signal routing assembly of claim 1 wherein said first and second routing devices are directional couplers.

37. The electromagnetic signal routing assembly of claim 1 wherein said first and second routing devices are duplexing filters.

38. An electromagnetic signal routing assembly for effecting two way duplex transmissions comprising:
a transmission signal input for receiving first transmission signal;
a common port for outputting a portion of said first transmission signal from said transmission signal input and simultaneously receiving a second transmission signal;
a transmission outputting a portion of said second transmission signal;
a signal divider receiving said first transmission signal from said transmission signal input and dividing said first transmission signal into first and second divided transmission signals having amplitudes within a first amplitude range of each other and a first relative phase shift therebetween;
first and second routing devices each having at least first, second and third ports, said first and second routing device being configured to simultaneously deliver a signal at said first port to said second port and another signal at said second port to said third port, wherein:
s21 is a transmission coefficient from said first port to said second port;
s32 is a transmission coefficient from said second port to said third;
s31 is a transmission coefficient from said first port to said third port;
said s21 is greater than said s31; and
said s32 is greater than said s1;
said first and second routing devices are each a directional coupler;
said first routing device having said first divided transmission signal applied to said first port of said first routing device and simultaneously producing:
a first divided transmission output signal at said second port of said first routing device; and
a first transmission leakage signal at said third port of said first routing device,
each resultant from said first divided transmission signal;
said first routine device also having a third divided transmission signal, when present, applied to said second port of said first routing device and producing, simultaneously with said first divided transmission output signal and said first transmission leakage signal, a third divided transmission output signal at said third port of said first routing device resultant from said third divided transmission signal;
said second routing device having said second divided transmission signal applied to said first port of said second routing device and simultaneously producing:

a second divided transmission output signal at said second port of said second routing device; and
a second transmission leakage signal at said third port of said second routing device,
each resultant from said second divided transmission signal;
said second routing device also having a fourth divided transmission signal, when present, applied to said second port of said second routing device and producing, simultaneously with said second divided transmission output signal and said second transmission leakage signal, a fourth divided transmission output signal at said third port of said second routing device resultant from said fourth divided transmission signal;
a signal divider/combiner having:
first and second divider/combiner ports for receiving said first and second divided transmission output signals and a configuration for combining these signals at levels within a second relative amplitude range and with a second relative phase shift therebetween to output said portion of said first transmission signal to said common port; and
said configuration being such that said second transmission signal, when present and received at said common port, said second transmission signal is divided into said third and fourth divided transmission signals having amplitudes within said second relative amplitude range and with said second relative phase shift therebetween; and
a signal combiner having first and second combiner inputs for receiving said first and second transmission leakage signals and, when present, for receiving said third and fourth divided transmission output signals, said signal combiner including said transmission signal output, and said signal combiner being configured to introduce a third relative phase shift into signals applied to at least one of said first and second combiner inputs and combine signals applied to said first and second combiner inputs at said transmission signal output at levels within a third amplitude range such that:
said first and second transmission leakage signals arrive at said transmission signal output at levels within an amplitude tolerance range and a total relative phase shift therebetween within a phase tolerance range situated about 180 degrees to effect a destructive combination resulting in at least partial cancellation of said first and second transmission leakage signals at said transmission signal output; and
said third and fourth divided transmission output signals, when present, arrive at said transmission signal output to effect a constructive combination of said third and fourth divided transmission output signals to output a portion of said second transmission signal at said transmission signal output.

39. The electromagnetic signal routing assembly of claim 38 wherein said signal divider is a quadrature hybrid introducing said first relative phase shift and having an input port receiving said first transmission signal, an isolated port with a termination applied thereto, said first and second divided transmission signals are output at first and second divider outputs of said quadrature hybrid, said first relative phase shift is such that said first divided transmission signal lags said second divided transmission signal by said first relative phase shift.

40. The electromagnetic signal routing assembly of claim 39 wherein said signal divider/combiner is a quadrature hybrid introducing said second relative phase shift and having an isolated port with a termination applied thereto, two ports for receiving said first and second divided transmission output signals, said second relative phase shift introduced into said second divided transmission output signal is such that said second divided transmission output signal lags said first divided transmission output signal by said second relative phase shift such that:
said first and second divided transmission output signals are constructively combined at said common port to output said portion of the first transmission signal; and
said second transmission signal, when present, and simultaneously received at said common port is divided into said third and fourth divided transmission signals having said second relative phase shift, and said fourth divided transmission signal lags said third divided transmission signal by said second relative phase shift.

41. The electromagnetic signal routing assembly of claim 40 wherein said signal combiner is a quadrature hybrid having an isolated port with a termination applied thereto, two ports for receiving said first and second transmission leakage signals, said first transmission leakage signal lags said second transmission leakage signal by said third relative phase shift, and said first and second leakage transmission signals are combined at said isolated port and dissipated in said termination.

42. The electromagnetic signal routing assembly of claim 38 wherein said portion of said first transmission signal delivered to said common port is in a range of 0.2 dB to 4.0 dB lower than an amplitude level of said first transmission signal at said transmission signal input.

43. The electromagnetic signal routing assembly of claim 42 wherein said portion of said second transmission signal delivered to said transmission signal output is in a range of 6.0 dB to 40.0 dB lower than an amplitude level of said second transmission signal delivered at said common port.

44. An electromagnetic signal routing assembly for effecting two way duplex transmissions, comprising:
a transmission signal input for receiving first transmission signal;
a common port for outputting a portion of said first transmission signal from said transmission signal input and simultaneously receiving a second transmission signal;
a transmission signal output for outputting a portion of said second transmission signal;
a signal divider receiving said first transmission signal from said transmission signal input and dividing said first transmission signal into first and second divided transmission signals having amplitudes within a first amplitude range of each other find a first relative phase shift therebetween;
first and second routing devices each having at least first, second and third ports, said first and second routing devices being configured to simultaneously deliver a signal at said first port to said second port and another signal at said second port to said third port, wherein:
s21 is a transmission coefficient from said first port to said second port;
s32 is a transmission coefficient from said second port to said third;
s31 is a transmission coefficient from said first port to said third port;
said s21 is greater than said s31; and
said s32 is greater than said s31;
said first routing device having said first divided transmission signal applied to said first port of said first routing device and simultaneously producing:
a first divided transmission output signal at said second port of said first routing device; and a first transmission leakage signal at said third port of said first routing device, each resultant from said first divided transmission signal;

said first routing device also having a third divided transmission signal, when present, applied to said second port of said first routing device and producing, simultaneously with said first divided transmission output signal and said first transmission leakage signal, a third divided transmission output signal at said third port of said first routing device resultant from said third divided transmission signal;

said second routing device having said second divided transmission signal applied to said first port of said second routing device and simultaneously producing:
  a second divided transmission output signal at said second port of said second routing device; and
  a second transmission leakage signal at said third port of said second routing device,
each resultant from said second divided transmission signal;

said second routing device also having a fourth divided transmission signal, when present, applied to said second port of said second routing device and producing, simultaneously with said second divided transmission output signal and said second transmission leakage signal, a fourth divided transmission output signal at said third port of said second routing device resultant from said fourth divided transmission signal;

a first modulator disposed to receive said first divided transmission signal, modulate said first divided transmission signal, and apply said first divided transmission signal, after modulation thereof, to said first port of said first routing device;

a second modulator disposed to receive said second divided transmission signal, modulate said second divided transmission signal, and apply said second divided transmission signal, after modulation thereof, to said first port of said second routing device a signal divider/combiner having:
  first and second divider/combiner ports for receiving said first and second divided transmission output signals and a configuration for combining these signals at levels within a second relative amplitude range and with a second relative phase shift therebetween to output said portion of said first transmission signal to said common port; and
  said configuration being such that said second transmission signal, when present and received at said common port, said second transmission signal is divided into said third and fourth divided transmission signals having amplitudes within said second relative amplitude range and with said second relative phase shift therebetween; and a signal combiner having first and second combiner inputs for receiving said first and second transmission leakage signals and, when present, for receiving said third and fourth divided transmission output signals, said signal combiner including said transmission signal output, and said signal combiner being configured to introduce a third relative phase shift into signals applied to at least one of said first and second combiner inputs and combine signals applied to said first and second combiner inputs at said transmission signal output at levels within a third amplitude range such that:
  said first and second transmission leakage signals arrive at said transmission signal output at levels within an amplitude tolerance range and a total relative phase shift therebetween within a phase tolerance range situated about 180 degrees to effect a destructive combination resulting in at least partial cancellation of said first and second transmission leakage signals at said transmission signal output; and
  said third and fourth divided transmission output signals, when present, arrive at said transmission signal output to effect a constructive combination of said third and fourth divided transmission output signals to output a portion of said second transmission signal at said transmission signal output.

45. An electromagnetic signal routing assembly for effecting two way duplex transmissions, comprising:
  a transmission signal input for receiving first transmission signal;
  a common port for outputting a portion of said first transmission signal from said transmission signal input and simultaneously receiving a second transmission signal;
  a transmission signal output for outputting a portion of said second transmission signal;
  a signal divider receiving said first transmission signal from said transmission signal input and dividing said first transmission signal into first and second divided transmission signals having amplitudes within a first amplitude range of each other and a first relative phase shift therebetween;
  first and second routing devices each having at least first, second and third ports, said first and second routing devices being configured to simultaneously deliver a signal at said first port to said second port and another signal at said second port to said third port, wherein:
    s21 is a transmission coefficient from said first port to said second port;
    s32 is a transmission coefficient from said second port to said third;
    s31 is a transmission coefficient from said first port to said third port;
    said s21 is greater than said s31; and
    said s32 is greater than said s31;
  said first and second routing devices each be a duplexing filter;
  said first routing device having said first divided transmission signal applied to said first port of said first routing device and simultaneously producing:
    a first divided transmission output signal at said second port of said first routing device; and
    a first transmission leakage signal at said third port of said first routing device,
  each resultant from said first divided transmission signal;
  said first routing device also having a third divided transmission signal, when present, applied to said second port of said first routing device and producing, simultaneously with said first divided transmission output signal and said first transmission leakage signal, a third divided transmission output signal at said third port of said first routing device resultant from said third divided transmission signal;
  said second routing device having said second divided transmission signal applied to said first port of said second routing device and simultaneously producing:
    a second divided transmission output signal at said second port of said second routing device; and
    a second transmission leakage signal at said third port of said second routing device,
  each resultant from said second divided transmission signal;
  said second routing device also having a fourth divided transmission signal, when present, applied to said second port of said second routing device and producing, simultaneously with said second divided transmission output signal and said second transmission leakage signal, a fourth divided transmission output signal at said third port of said second routing device resultant from said fourth divided transmission signal;

a signal divider/combiner having:
  first and second divider/combiner ports for receiving said first and second divided transmission output signals and a configuration for combining these signals at levels within a second relative amplitude range and with a second relative phase shift therebetween to output said portion of said first transmission signal to said common port; and
  said configuration being such that said second transmission signal, when present and received at said common port, said second transmission signal is divided into said third and fourth divided transmission signals having amplitudes within said second relative amplitude range and with said second relative phase shift therebetween; and a signal combiner having first and second combiner inputs for receiving said first and second transmission leakage signals and, when present, for receiving said third and fourth divided transmission output signals, said signal combiner including said transmission signal output, and said signal combiner being configured to introduce a third relative phase shift into signals applied to at least one of said first and second combiner inputs and combine signals applied to said first and second combiner inputs at said transmission signal output at levels within a third amplitude range such that:

said first and second transmission leakage signals arrive at said transmission signal output at levels within an amplitude tolerance range and a total relative phase shift therebetween within a phase tolerance range situated about 180 degrees to effect a destructive combination resulting in at least partial cancellation of said first and second transmission leakage signals at said transmission signal output; and said third and fourth divided transmission output signals, when present, arrive at said transmission signal output to effect a constructive combination of said third and fourth divided transmission output signals to output a portion of said second transmission signal at said transmission signal output.

\* \* \* \* \*